United States Patent
Naik et al.

(10) Patent No.: US 11,500,566 B2
(45) Date of Patent: Nov. 15, 2022

(54) CLOUD-BASED DISTRIBUTED DATA STORAGE SYSTEM USING BLOCK-LEVEL DEDUPLICATION BASED ON BACKUP FREQUENCIES OF INCOMING BACKUP COPIES

(71) Applicant: Commvault Systems, Inc., Tinton Falls, NJ (US)

(72) Inventors: Bharat Pundalik Naik, Palo Alto, CA (US); Xiangyu Wang, Fremont, CA (US); Avinash Lakshman, Fremont, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 17/153,674

(22) Filed: Jan. 20, 2021

(65) Prior Publication Data

US 2022/0066670 A1 Mar. 3, 2022

Related U.S. Application Data

(60) Provisional application No. 63/070,162, filed on Aug. 25, 2020.

(51) Int. Cl.
| | | |
|---|---|---|
| G06F 3/06 | (2006.01) | |
| H04L 29/08 | (2006.01) | |
| H04L 67/1097 | (2022.01) | |

(52) U.S. Cl.
CPC .......... *G06F 3/0641* (2013.01); *G06F 3/067* (2013.01); *G06F 3/0608* (2013.01);
(Continued)

(58) Field of Classification Search
CPC .... G06F 3/0641; G06F 3/0608; G06F 3/0664; G06F 3/067; H04L 67/1097
See application file for complete search history.

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.
(Continued)

*Primary Examiner* — Prasith Thammavong
(74) *Attorney, Agent, or Firm* — Commvault Systems, Inc.

(57) ABSTRACT

Disclosed deduplication techniques at a distributed data storage system guarantee that space reclamation will not affect deduplicated data integrity even without perfect synchronization between components. By understanding certain "behavioral" characteristics and schedule cadences of backup operations that generate backup copies received at the distributed data storage system, data blocks that are not re-written by subsequent backup copies are pro-actively aged, while promoting continued retention of data blocks that are re-written. An expiry scheme operates with block-level granularity. Each unique deduplicated data block is given an expiry timeframe based on the block's arrival time at the distributed data storage system (i.e., when a backup copy supplies the block) and further based on backup frequencies of the various virtual disks referencing a unique system-wide identifier of the block, which is based on the block's hash value. Communications between components are kept to an as-needed basis. Cloud-based and multi-cloud configurations are disclosed.

20 Claims, 18 Drawing Sheets

(52) U.S. Cl.
CPC .......... *G06F 3/0619* (2013.01); *G06F 3/0664* (2013.01); *G06F 3/0665* (2013.01); *G06F 3/0683* (2013.01); *H04L 67/1097* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescent et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescent et al. |
| 7,395,282 B1 | 7/2008 | Crescent et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 7,840,537 B2 | 11/2010 | Gokhale et al. |
| 8,131,924 B1 * | 3/2012 | Frandzel ............ G06F 3/0682 |
| | | 711/113 |
| 8,140,786 B2 | 3/2012 | Bunte et al. |
| 8,170,995 B2 | 5/2012 | Prahlad et al. |
| 8,219,524 B2 | 7/2012 | Gokhale |
| 8,229,954 B2 | 7/2012 | Kottomtharayil et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,401,996 B2 | 3/2013 | Muller et al. |
| 8,412,677 B2 | 4/2013 | Klose |
| 8,484,162 B2 | 7/2013 | Prahlad et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,578,120 B2 | 11/2013 | Attarde et al. |
| 8,612,439 B2 | 12/2013 | Prahlad et al. |
| 8,706,867 B2 | 4/2014 | Vijayan |
| 8,732,133 B2 | 5/2014 | Attarde et al. |
| 8,930,306 B1 | 1/2015 | Ngo et al. |
| 8,935,492 B2 | 1/2015 | Gokhale et al. |
| 8,950,009 B2 | 2/2015 | Vijayan et al. |
| 8,954,446 B2 | 2/2015 | Vijayan Retnamma et al. |
| 9,015,181 B2 | 4/2015 | Kottomtharayil et al. |
| 9,020,890 B2 | 4/2015 | Kottomtharayil et al. |
| 9,020,900 B2 | 4/2015 | Vijayan Retnamma et al. |
| 9,021,198 B1 | 4/2015 | Vijayan et al. |
| 9,021,282 B2 | 4/2015 | Muller |
| 9,069,707 B1 * | 6/2015 | Fortson ............... G06F 16/1752 |
| 9,098,495 B2 | 8/2015 | Gokhale |
| 9,104,623 B2 | 8/2015 | Vijayan et al. |
| 9,116,633 B2 | 8/2015 | Sancheti et al. |
| 9,116,850 B2 | 8/2015 | Vijayan et al. |
| 9,189,170 B2 | 11/2015 | Kripalani et al. |
| 9,218,374 B2 | 12/2015 | Muller et al. |
| 9,218,376 B2 | 12/2015 | Muller et al. |
| 9,239,687 B2 | 1/2016 | Vijayan et al. |
| 9,262,496 B2 | 2/2016 | Kumarasamy et al. |
| 9,275,086 B2 | 3/2016 | Kumarasamy et al. |
| 9,286,110 B2 | 3/2016 | Mitkar et al. |
| 9,298,715 B2 | 3/2016 | Kumarasamy et al. |
| 9,311,121 B2 | 4/2016 | Deshpande et al. |
| 9,336,226 B2 | 5/2016 | Vibhor et al. |
| 9,378,035 B2 | 6/2016 | Kripalani |
| 9,405,482 B2 | 8/2016 | Varadharajan et al. |
| 9,411,534 B2 | 8/2016 | Lakshman et al. |
| 9,424,151 B2 | 8/2016 | Lakshman et al. |
| 9,461,881 B2 | 10/2016 | Kumarasamy et al. |
| 9,483,205 B2 | 11/2016 | Lakshman et al. |
| 9,495,404 B2 | 11/2016 | Kumarasamy et al. |
| 9,558,085 B2 | 1/2017 | Lakshman |
| 9,633,022 B2 | 4/2017 | Vijayan et al. |
| 9,633,033 B2 | 4/2017 | Vijayan et al. |
| 9,633,056 B2 | 4/2017 | Attarde et al. |
| 9,639,274 B2 | 5/2017 | Maranna et al. |
| 9,641,388 B2 | 5/2017 | Kripalani et al. |
| 9,665,591 B2 | 5/2017 | Vijayan et al. |
| 9,678,968 B1 * | 6/2017 | Taylor ............... G06F 3/0608 |
| 9,710,465 B2 | 7/2017 | Dornemann et al. |
| 9,747,169 B2 | 8/2017 | Kottomtharayil et al. |
| 9,753,955 B2 | 9/2017 | Agrawal et al. |
| 9,798,489 B2 | 10/2017 | Lakshman et al. |
| 9,848,046 B2 | 12/2017 | Mehta et al. |
| 9,864,530 B2 | 1/2018 | Lakshman |
| 9,875,063 B2 | 1/2018 | Lakshman |
| 9,983,936 B2 | 5/2018 | Dornemann et al. |
| 10,067,722 B2 | 9/2018 | Lakshman |
| 10,084,873 B2 | 9/2018 | Dornemann et al. |
| 10,162,528 B2 | 12/2018 | Sancheti et al. |
| 10,210,048 B2 | 2/2019 | Sancheti |
| 10,223,211 B2 | 3/2019 | Kumarasamy et al. |
| 10,223,212 B2 | 3/2019 | Kumarasamy et al. |
| 10,228,962 B2 | 3/2019 | Dornemann et al. |
| 10,248,174 B2 | 4/2019 | Lakshman et al. |
| 10,296,368 B2 | 5/2019 | Dornemann et al. |
| 10,310,953 B2 | 6/2019 | Vijayan et al. |
| 10,324,897 B2 | 6/2019 | Amarendran et al. |
| 10,324,914 B2 | 6/2019 | Kumarasamy et al. |
| 10,339,106 B2 | 7/2019 | Vijayan et al. |
| 10,346,259 B2 | 7/2019 | Gokhale et al. |

(56) References Cited

U.S. PATENT DOCUMENTS

| | | |
|---|---|---|
| 10,474,542 B2 | 11/2019 | Mitkar et al. |
| 10,552,058 B1* | 2/2020 | Jadon .................. G06F 3/0647 |
| 10,579,586 B1* | 3/2020 | Golpayegani ....... G06F 16/9014 |
| 10,592,350 B2 | 3/2020 | Dornemann |
| 10,664,352 B2 | 5/2020 | Rana |
| 10,678,758 B2 | 6/2020 | Dornemann |
| 10,691,187 B2 | 6/2020 | Lakshman et al. |
| 10,740,193 B2 | 8/2020 | Dhatrak |
| 10,740,300 B1 | 8/2020 | Lakshman et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,776,329 B2 | 9/2020 | Rao et al. |
| 10,795,577 B2 | 10/2020 | Lakshman et al. |
| 10,846,024 B2 | 11/2020 | Lakshman et al. |
| 10,848,468 B1 | 11/2020 | Lakshman et al. |
| 10,853,195 B2 | 12/2020 | Ashraf et al. |
| 10,872,069 B2 | 12/2020 | Dornemann et al. |
| 10,877,928 B2 | 12/2020 | Nagrale et al. |
| 10,891,198 B2 | 1/2021 | Nara et al. |
| 10,949,308 B2 | 3/2021 | Iyer et al. |
| 11,099,956 B1 | 8/2021 | Polimera et al. |
| 11,106,632 B2 | 8/2021 | Bangalore et al. |
| 11,113,246 B2 | 9/2021 | Mitkar et al. |
| 11,218,450 B2 | 1/2022 | Polimera et al. |
| 11,221,939 B2 | 1/2022 | Degaonkar et al. |
| 11,223,535 B2 | 1/2022 | Parvathamvenkatas et al. |
| 2004/0205112 A1* | 10/2004 | Margolus ............ G06F 16/2358 709/201 |
| 2006/0224846 A1 | 10/2006 | Amarendran et al. |
| 2009/0319534 A1 | 12/2009 | Gokhale |
| 2011/0093664 A1* | 4/2011 | Leppard ................ G06F 3/0683 711/154 |
| 2011/0107052 A1* | 5/2011 | Narayanasamy ..... G06F 3/0608 711/170 |
| 2011/0307457 A1* | 12/2011 | Ishii ...................... G06F 12/023 707/E17.005 |
| 2012/0150818 A1 | 6/2012 | Vijayan Retnamma et al. |
| 2012/0150826 A1 | 6/2012 | Vijayan Retnamma et al. |
| 2013/0339298 A1 | 12/2013 | Muller et al. |
| 2013/0339299 A1 | 12/2013 | Muller et al. |
| 2013/0339300 A1 | 12/2013 | Muller et al. |
| 2013/0339310 A1 | 12/2013 | Muller et al. |
| 2014/0196038 A1 | 7/2014 | Kottomtharayil et al. |
| 2014/0201157 A1 | 7/2014 | Pawar et al. |
| 2014/0201170 A1 | 7/2014 | Vijayan et al. |
| 2014/0201485 A1 | 7/2014 | Ahn et al. |
| 2015/0074536 A1 | 3/2015 | Varadharajan et al. |
| 2016/0019224 A1 | 1/2016 | Ahn et al. |
| 2016/0142485 A1 | 5/2016 | Mitkar et al. |
| 2016/0283372 A1* | 9/2016 | Davis .................. G06F 3/0616 |
| 2016/0342485 A1* | 11/2016 | McHugh ............. G06F 11/1443 |
| 2016/0350302 A1 | 12/2016 | Lakshman |
| 2016/0350391 A1 | 12/2016 | Vijayan et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0277639 A1* | 9/2017 | Awad .................. G06F 12/1027 |
| 2017/0329530 A1* | 11/2017 | Lakshman ............ G06F 3/0641 |
| 2018/0046640 A1* | 2/2018 | Hagar .................. G06F 16/125 |
| 2018/0196745 A1* | 7/2018 | Karr ...................... G06F 16/162 |
| 2018/0253255 A1 | 9/2018 | Jain et al. |
| 2018/0285202 A1 | 10/2018 | Bhagi et al. |
| 2018/0285205 A1 | 10/2018 | Mehta et al. |
| 2018/0285383 A1 | 10/2018 | Nara et al. |
| 2019/0391739 A1* | 12/2019 | Mueller ................. G06F 3/065 |
| 2020/0073574 A1 | 3/2020 | Pradhan |
| 2020/0183885 A1* | 6/2020 | Li ........................ H04M 1/2477 |
| 2020/0293213 A1 | 9/2020 | Haridas et al. |
| 2020/0293498 A1 | 9/2020 | Vijayan et al. |
| 2020/0319694 A1 | 10/2020 | Mohanty et al. |
| 2020/0349027 A1 | 11/2020 | Bansod et al. |
| 2020/0394110 A1 | 12/2020 | Ramohalli Gopala Rao et al. |
| 2020/0401489 A1 | 12/2020 | Mitkar et al. |
| 2021/0019294 A1 | 1/2021 | Attarde et al. |
| 2021/0019333 A1 | 1/2021 | Attarde et al. |
| 2021/0049079 A1 | 2/2021 | Kumar et al. |
| 2021/0064484 A1 | 3/2021 | Dornemann et al. |
| 2021/0089215 A1 | 3/2021 | Ashraf et al. |
| 2021/0133167 A1 | 5/2021 | Nara |
| 2021/0157628 A1 | 5/2021 | Dornemann et al. |
| 2021/0173744 A1 | 6/2021 | Agrawal et al. |
| 2021/0173811 A1 | 6/2021 | Agrawal et al. |
| 2021/0209060 A1 | 7/2021 | Kottomtharayil et al. |
| 2021/0255771 A1 | 8/2021 | Kilaru et al. |
| 2021/0271564 A1 | 9/2021 | Mitkar et al. |
| 2021/0286639 A1 | 9/2021 | Kumar |
| 2021/0357246 A1 | 11/2021 | Kumar et al. |
| 2021/0397522 A1 | 12/2021 | Owen et al. |
| 2022/0012134 A1 | 1/2022 | Chatterjee et al. |
| 2022/0019372 A1 | 1/2022 | Vastrad et al. |
| 2022/0066669 A1 | 3/2022 | Naik et al. |
| 2022/0066670 A1 | 3/2022 | Naik et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

Bhagwat, Extreme Binning: Scalable, Parallel Deduplication for Chunk-based File Backup. IEEE 2009, 9 pages.

Cohen, Edith, et al., "The Age Penalty and Its Effect on Cache Performance." In USITS, pp. 73-84. 2001.

Cohen, et al., "Aging through cascaded caches: Performance issues in the distribution of web content." In ACM SIGCOMM Computer Communication Review, vol. 31, No. 4, pp. 41-53. ACM, 2001.

Cohen, et al.,"Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How To,"http://documentation.commvault.com/commvault/release_8_0_0/books_online_1/english_us/features/single_instance/single_instance_how_to.htm, internet accessed on Jan. 26, 2009, 7 pages.

CommVault Systems, Inc., "Deduplication,"http://documentation.commvault.com/commvault/release_8_0_0/books_online_1/english_us/features/single_instance/single_instance.htm, internet accessed on Jan. 26, 2009, 9 pages.

Dubnicki, et al. "HYDRAstor: A Scalable Secondary Storage." FAST. vol. 9.2009, 74 pages.

Lakshman et al., "Cassandra—A Decentralized Structured Storage System", https://doi.org/101145/1773912.1773922, ACM SIGOPS Operating Systems Review, vol. 44, Issue 2, Apr. 2010, pp. 35-40.

(56) References Cited

OTHER PUBLICATIONS

Wei, et al., "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.
Naik, et al., U.S. Appl. No. 17/153,667 published as 2022/0066669, filed Jan. 20, 2021, Optimized Deduplication Based on Backup Frequency in a Distributed Data Storage System.
U.S. Appl. No. 17/165,266, filed Feb. 2, 2021, by Nara, et al.
U.S. Appl. No. 17/389,204, filed Jul. 29, 2021, by Kavaipatti Anantharamakrishnan.
U.S. Appl. No. 17/389,204, filed Jul. 29, 2021, by Mahajan, et al.
U.S. Appl. No. 17/698,811, filed Mar. 18, 2022, by Kumar.
U.S. Appl. No. 17/526,927, filed Nov. 15, 2021, by Kapadia, et al.
U.S. Appl. No. 17/501,881, filed Oct. 14, 2021, by Polimera, et al.
U.S. Appl. No. 17/501,881, filed Oct. 14, 2021, by Dornemann, et al.
U.S. Appl. No. 17/508,822, filed Oct. 22, 2021, by Mutha, et al.
U.S. Appl. No. 17/465,683, filed Sep. 2, 2021, by Camargos, et al.
U.S. Appl. No. 17/465,722, filed Sep. 2, 2021, by Jain, et al.

\* cited by examiner

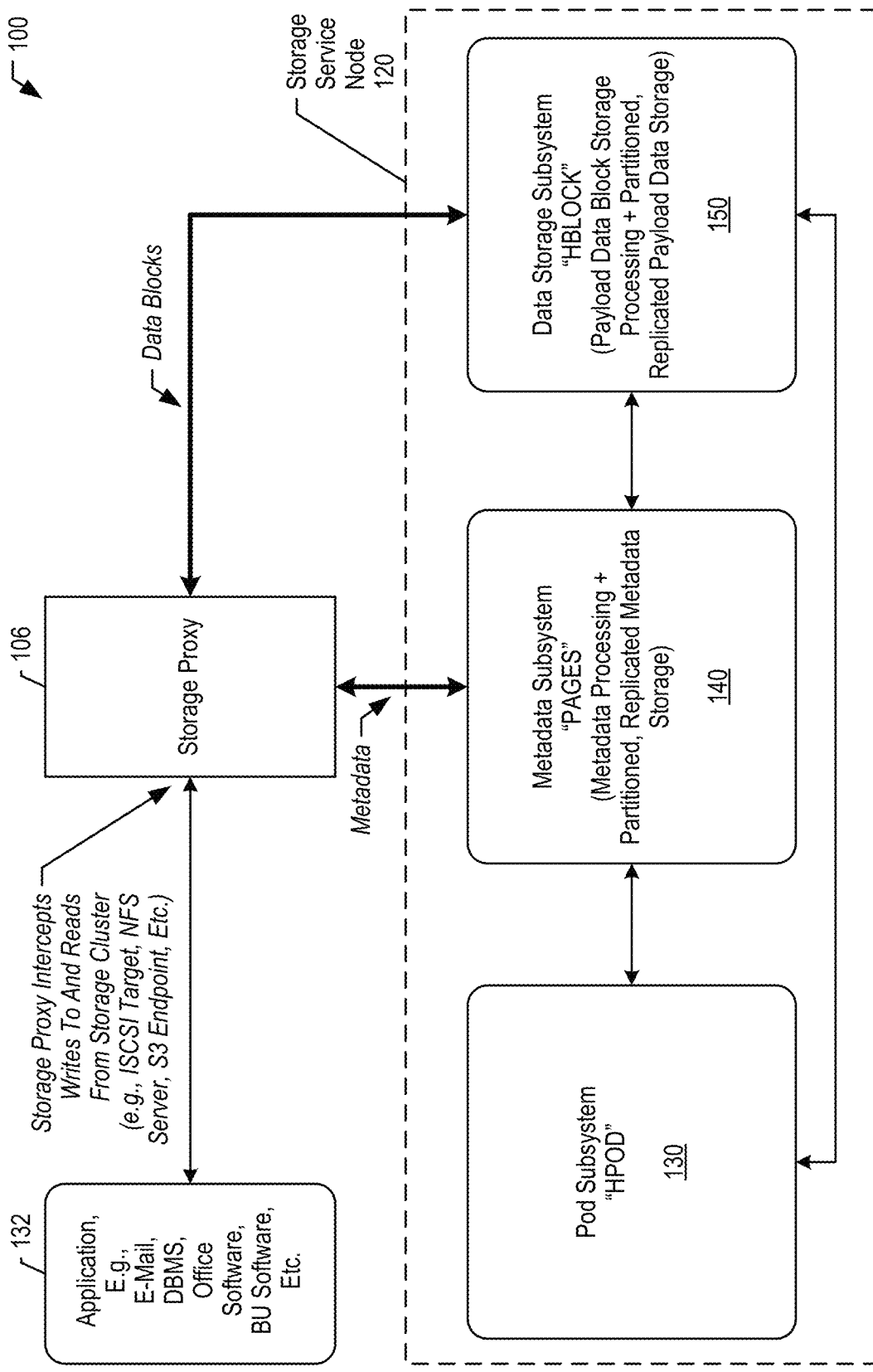
FIG. 1C Illustrative Storage Service Node Comprising Pod Synchronization Subsys., Metadata Subsys., And Data Storage Subsys.

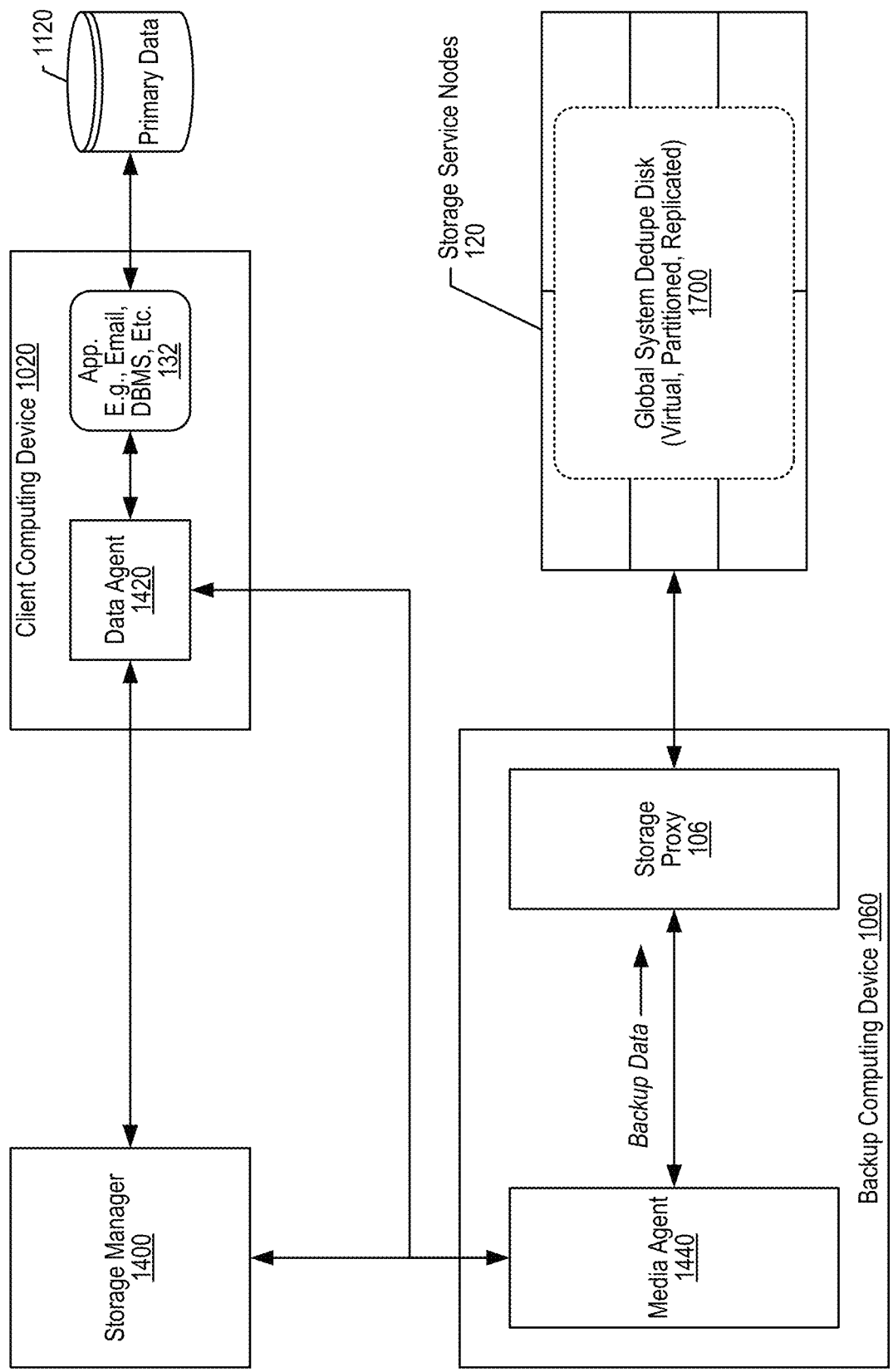
FIG. 1G  Backup Configuration – Data Storage Management System Using Distributed Data Storage Platform For Storing Backup Copies With Deduplication

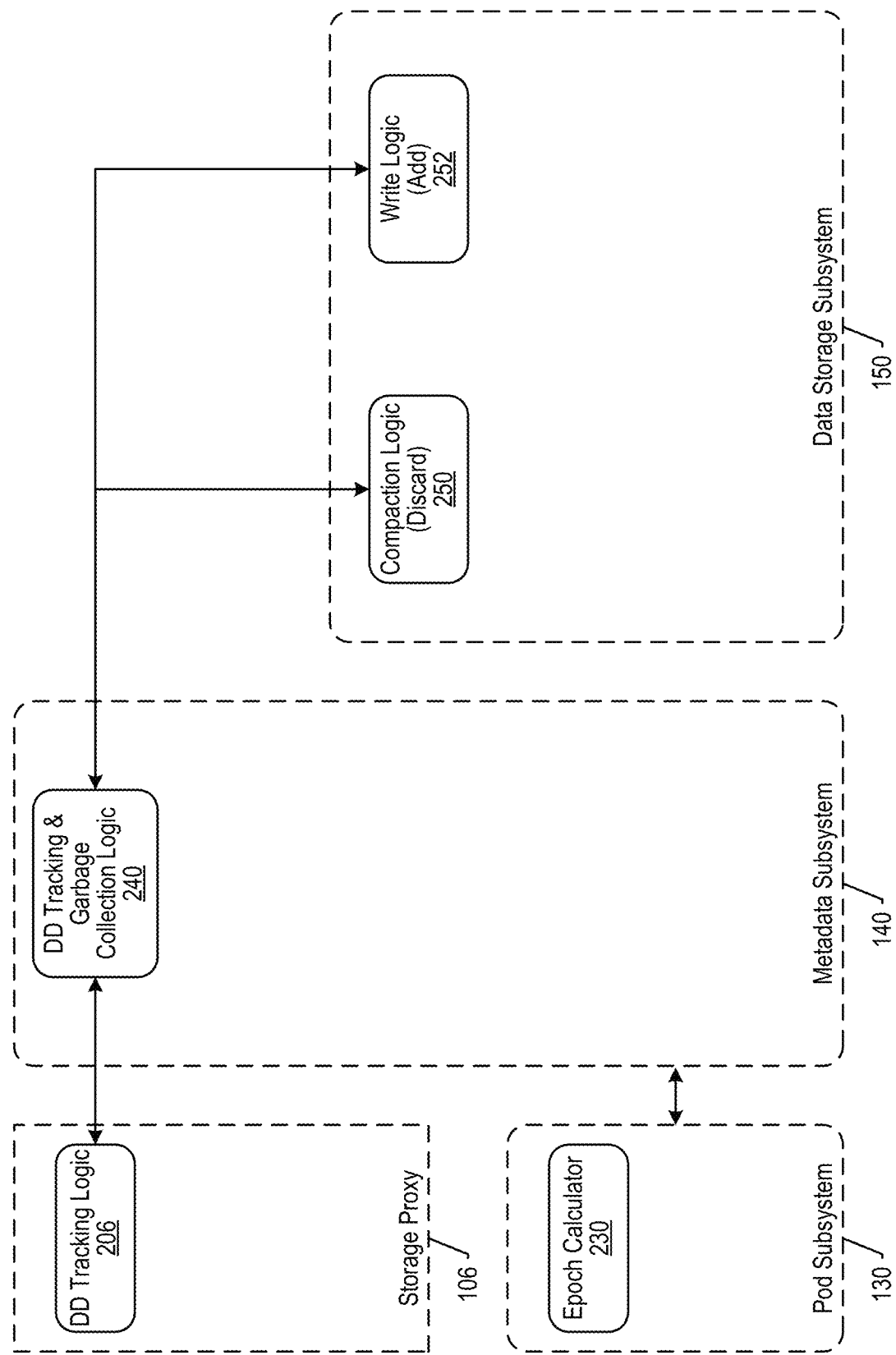
FIG. 2A  Distributed Storage Platform – Deduplication Components Not Necessarily Residing On Same Storage Service Node

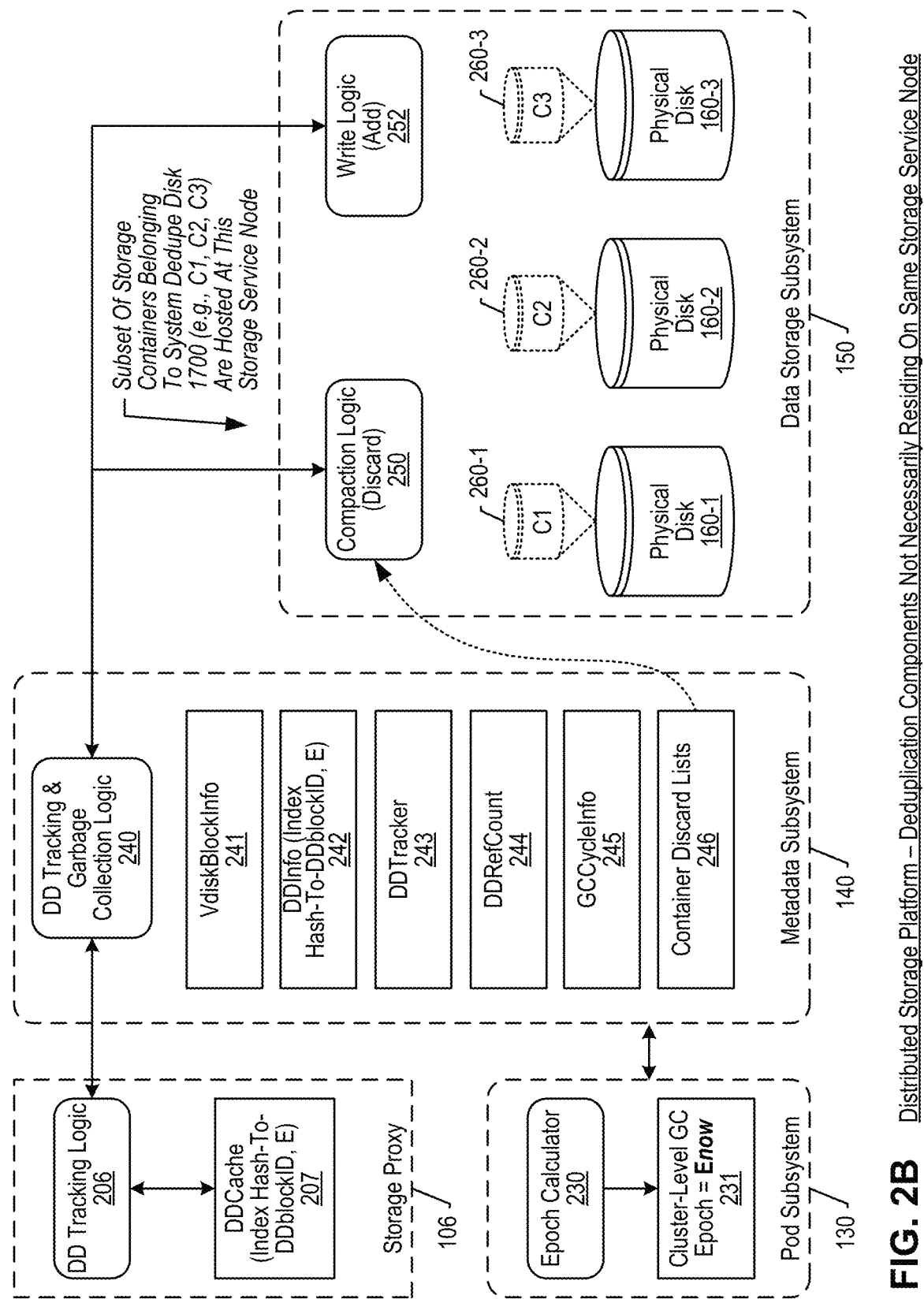
FIG. 2B  Distributed Storage Platform – Deduplication Components Not Necessarily Residing On Same Storage Service Node 207, 242

| Key | Value |
|---|---|
| Hash Value | DDblockID, E |

FIG. 2C DDCache & DDInfo Column Families

243

| Key: UserVdiskMetadataKey | | |
|---|---|---|
| SystemDDdiskContainerID | | |
| DDblockID | Hash Value | Timestamp |
| DDblockID_3 | Hash | Enow + 1 |
| DDblockID_9 | Hash | Enow + 1 |

FIG. 2D In Each GC Cycle, A New DDTracker Column Family Tracks For Each User Vdisk Every New Write Request Intercepted By Storage Proxy

244

Key: SystemDDdiskContainerID

| DDhash | DDblockID Expiry (Updated) | DDblockID | | | | | |
|---|---|---|---|---|---|---|---|
| | | uservdisk_1 | Ref Expiry | Ref W Epoch | ... | uservdisk_N | Ref Expiry | Ref W Epoch |
| Hash | $Eu$ | 1 | $Ew1 +$ uservdisk_1 _FBUFreq | $Ew1$ | | $N$ | $Ewn +$ uservdisk_N _FBUFreq | $EwN$ |

Max(Ref Expiry columns)

From Timestamp in DDTracker

DDRefCount Column Family Updated By Background GC Process In Each GC Cycle (GC Prep Phase) Based On Scanning DDTracker: For Every Undeleted DDblockID, Process Info In DDTracker, Update DDRefCount Entries, And Update DDblockID Expiry

| GC Prep Stage Epoch | | |
|---|---|---|
| Storage Service Node (SSN) Name (hostname) *h1* | Storage Service Node (SSN) Name (hostname) *h2* | . . . . |
| *1, 21, 28* | *10, 18, 24, 26* | |

*Hostname = Primary Metadata Node Of User Vdisk*

FIG. 2F Workload Assignments For Discard (GC) Prep Stage. To Update DDRefCount, The Workload Of Scanning DDTracker Column Families (each DDTracker Associated With A User Vdisk) Is Distributed Among Storage Service Nodes (SSN) According To This Table (Persisted In Case SSN Fails)

246 ⟶

| Key: SystemDDdisk | | |
|---|---|---|
| SystemDDdiskContainerID | | . . . |
| Epoch *x* | Epoch *y* | . . . |
| *DDblockID_1, DDblockID_4, etc.* | *DDblockID_3, DDblockID_24, etc.* | |

FIG. 2G Garbage Block ID Set (Discard List) Generated In GC Stage After GC Prep Stage

CLOUD-BASED DISTRIBUTED DATA STORAGE SYSTEM USING BLOCK-LEVEL DEDUPLICATION BASED ON BACKUP FREQUENCIES OF INCOMING BACKUP COPIES

INCORPORATION BY REFERENCE TO ANY PRIORITY APPLICATIONS

This application claims priority to U.S. Pat. App. No. 63/070,162 filed on Aug. 25, 2020. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Deduplication in a distributed data storage platform requires tightly coupled communications among components to ensure that deduplication tracking is kept current at the various nodes that form the storage platform. However, communicating a lot of information frequently among many components places a substantial burden on network bandwidth and component cycle time that is needed for processing data storage and retrieval requests. Therefore, a solution is needed that scales well to large and very active data storage platforms while maintaining highly accurate distributed deduplication tracking with low communications overhead.

SUMMARY

The present inventors devised a technological solution that optimizes deduplicated storage of backup copies at a distributed data storage platform (hereinafter the "distributed data storage system"). The present solution is scalable and guarantees that space reclamation will not affect deduplicated data integrity even without perfect synchronization between components. The illustrative approach balances the need for aggressive space reclamation of stale data against the need to minimize re-writes of existing deduplicated data. Discarding data too aggressively will slow system performance as new data needs to be written that was already on the distributed data storage system. Conversely, failing to discard stale data reduces the usable storage of the distributed data storage system.

By understanding certain "behavioral" characteristics and schedule cadences of backup operations that generate backup copies received at the distributed data storage system, the present approach pro-actively ages data blocks that are not re-written by subsequent backup copies, while promoting continued retention of data blocks that are re-written. Backup copies are typically generated on a substantially regular schedule, e.g., weekly full backups followed by daily incremental backups. Thus, the contents of full backup copies effectively replace earlier full and incremental backup copies, e.g., on a weekly basis. Since the illustrative distributed data storage system is an append-only system, unique data blocks that are not supplied again by later backup copies become stale after several full backup cycles, because the source data being backed up has changed and generates different backup data blocks. Eventually, older backup copies will become stale and the backup system that generated them will prune them from the distributed data storage system. At this point, stale data blocks that are no longer referenced by any backup copies are pro-actively deleted ("garbage collected") from the distributed data storage system.

The present inventors devised an expiry scheme that operates at block-level granularity on the distributed data storage system. This approach advantageously overcomes some prior-art deficiencies in which a single data block referenced by a single virtual disk would prevent discarding all other data blocks associated with the entire virtual disk, thus retaining a lot of stale data. This prior-art granularity scheme operated at the virtual disk level. The present approach also overcomes other prior-art deficiencies in which a new deduplication store was opened periodically, which automatically expired data blocks in the preceding deduplication store, but disadvantageously required re-writes of retained older data blocks already in the system.

Here, in contrast to these prior-art solutions, each unique deduplicated data block is given an expiry timeframe based on the block's arrival time at the distributed data storage system (i.e., when a backup copy supplies the data block) and further based on backup frequencies of the various virtual disks referencing the data block. The present solution includes a global (or system-wide) deduplication repository, which is configured as a virtual disk that is partitioned and replicated across storage nodes. The global system deduplication virtual disk (or "system-wide deduplication virtual disk") is not exposed as a storage target to the backup system generating the backup copies and is managed as a strictly internal resource of the distributed data storage system. By using the system-wide deduplication virtual disk, the distributed data storage system maximizes deduplication ratios across data sources, i.e., regardless of the user virtual disk addressed by an incoming backup copy. However, different user virtual disks may have different backup schedules. Therefore, the illustrative block-level expiry approach considers the various backup schedules in assigning expiry timeframes and deciding when and whether to discard individual data blocks.

A periodic "garbage collection" or "GC" or discard cycle evaluates each deduplicated data block tracked by the distributed data storage system. Blocks "written" (i.e., supplied by an incoming backup copy) in the preceding cycle are analyzed for reference counting and expiry timeframes. Illustratively, each backup copy received by the distributed data storage system comprises one or more files, and the distributed data storage system may address each file to a distinct user virtual disk. When the backup system prunes stale backup copies from the distributed data storage system, the pruning causes the distributed data storage system to logically delete the various user virtual disks comprising the backup files associated with the particular backup copy.

Because of deduplication, not every block that comes in with a backup copy is actually added to the distributed data storage system, but the write request is noted and tracked. A new data block with a new hash value receives a unique system-wide identifier (e.g., the "dedupe block identifier" or "DDblockID") and the new data block is added to the global deduplication virtual disk. A block that is "written" one or more times within a preceding cycle will have its expiry extended at least one more cycle during the analysis performed by the discard cycle. Should subsequent "writes" continue, the block's expiry will be extended again, thus ensuring that the block stays in the global deduplication virtual disk because it is still current. But when the subsequent writes wane, the block will eventually expire. If there are no more backup copies (and corresponding user virtual disks) on the distributed data storage system that reference the particular data block, the discard cycle identifies the data block for deletion, and a compaction engine will delete the block from the distributed data storage system. Should the expired data block appear again in a later write request, it will be seen as a new block and written anew to the distributed data storage system.

One of the key aspects of the disclosed approach is that in each discard cycle, the expiry timeframe of a deduplicated data block (DDblockID) may be extended to accommodate the least frequent full-backup frequency of any user virtual disk that references the data block. In this way, all virtual disks referencing the DDblockID are guaranteed the data block's survival at least through the next full backup operation. This key aspect provides flexibility and scalability without compromising data integrity. Moreover, this key aspect maintains the block-level granularity of the disclosed expiry scheme, which improves the effectiveness of the discard process.

The illustrative distributed data storage system comprises storage proxies that intercept backup copies being written to the distributed data storage system. Rather than adding every incoming data block to the distributed data storage system, the storage proxy applies a deduplication routine to the data block. The storage proxy uses hashing (e.g., MD5 without limitation) to compute a hash value for the incoming data block and checks whether the hash value is present in a local index or data structure at the storage proxy (e.g., DDCache).

If the storage proxy does not find the hash value in DDCache, the storage proxy passes the hash value to a metadata subsystem on a storage service node and receives an update therefrom, comprising a DDblockID and expiry timeframe if the DDblockID is known, i.e., has been previously added to the system-wide deduplication virtual disk. If the hash value is new to the metadata subsystem or if the expiry timeframe for the DDblockID is in the past (i.e., expired DDblockID according to the metadata subsystem), the data block is treated as a new block, and the storage proxy will store the data block to the system-wide deduplication virtual disk. The system-wide deduplication virtual disk is partitioned and duplicated across a plurality of data storage subsystems that are distinct from the metadata subsystem. The data storage subsystem assigns a new DDblockID to the new data block. The metadata subsystem updates its own tracking data structures, assigns a future expiry timeframe ("epoch") to the new DDblockID, and transmits the DDblockID and its expiry epoch to the storage proxy for updating its own local index (e.g., DDCache). If it turns out that the metadata subsystem reported to the storage proxy that the DDblockID corresponding to the hash value is not expired, the storage proxy updates its DDCache and the write request is noted in data structures at the metadata subsystem.

Otherwise, if the storage proxy found the hash value of the data block within its own index (e.g., DDCache), the storage proxy checks the expiry epoch of the corresponding DDblockID. If the DDblockID is not expired, the storage proxy reports the write request to the metadata subsystem so that it can update its local tracking data structures. On the other hand, if the storage proxy determines that the DDblockID has an expired epoch (according to DDCache), the storage proxy submits the hash value to the metadata subsystem as if not found in DDCache as described above.

Thus, during the I/O cycle of a given data block, its hash value is calculated, its presence in the global deduplication virtual disk is determined, and its pre-existing expiry (if any) determines whether the data block is added to the global deduplication virtual disk. The index at the storage proxy (e.g., DDCache) is updated only as needed to minimize updates sent by the metadata subsystem; no attempt is made to keep DDCache fully synchronized with the tracking data structures at the metadata subsystem. The metadata subsystem updates certain local tracking data structures for every incoming write request. One of these data structures is the illustrative DDTracker column family, which is updated for every write request from an incoming backup copy and enables proper reference counting.

Illustratively, a discard cycle runs weekly based on the typical cadence of full backup cycles, but the invention is not so limited. During a first phase of the discard cycle (the preparation stage), the metadata subsystem scans each DDTracker column family and adds the resulting processed information to a persistent column family used for tracking DDblockID reference counts (e.g., DDRefCount). For example, DDblockID_7 that was "written" or addressed to user virtual disk 1 (e.g., uservdisk_1) is added to DDRefCount showing that uservdisk_1 "wrote" DDblockID_7 to the system during an epoch as indicated by DDTracker. DDRefCount assigns an expiry to this DDblockID_7 instance based on the full backup frequency of uservdisk_1. Likewise, another data block having the same DDblockID (e.g., DDblockID_7), which was "written" or targeted to another user virtual disk (e.g., uservdisk_N) is added to DDRefCount showing that uservdisk_N "wrote" DDblockID_7 to the system during a write epoch as indicated by DDTracker. DDRefCount assigns an expiry to this other DDblockID_7 instance based on the full backup frequency of uservdisk_N, which may differ from that of uservdisk_1. Thus, every undeleted DDblockID in the global deduplication virtual disk has entries (columns) in DDRefCount corresponding to the various epochs when a new instance of the data block entered the system and columns for user virtual disks referencing the DDblockID. A maximum value of the various expiry columns, i.e., the longest expiry timeframe assigned to the DDblockID in the system (e.g., Eu) ensures that the DDblockID will survive between the sparsest virtual disk backups, and later helps to determine whether a certain DDblockID should be discarded.

Once the preparation stage has fully processed all DDTracker column families and persisted DDRefCount, a second phase of the discard cycle begins—the "garbage collection" or discard stage. The second phase checks whether the user virtual disks in DDRefCount are still present on the distributed data storage system. When a backup copy is pruned by the backup system that created it, the virtual disk(s) created to store the backup copy and/or its constituent files are deleted from the distributed data storage system configuration. Thus, backup copy deletions may result in DDRefCount decrementing the reference counts of certain DDblockIDs referenced by the corresponding virtual disks. The second phase further checks the maximum expiry epoch (e.g., Eu) of every DDblockID in DDRefCount. DDblockIDs with zero reference counts and expired Eu are placed by the metadata subsystem on discard lists. Because the global system deduplication virtual disk is distributed among a plurality of different storage containers on different storage service nodes, the discard lists are segregated by storage container and transmitted to the data storage subsystem nodes hosting the respective storage containers. There, the resident compaction engine ensures that the actual data blocks corresponding to the DDblockID are discarded, thus freeing up storage space.

On the other hand, a DDblockID that was "written" after the last discard cycle, is given an extension of time. Accordingly, the expiry epoch is incremented by the full backup frequency of the user virtual disk associated with the write request. If the maximum expiry epoch (Eu) increases at this point, the increase is reflected in the local index of the metadata subsystem (e.g., DDInfo). In this way, subsequent write requests of this DDblockID will be evaluated with respect to the updated (later) expiry epoch, thus extending the lifetime of the DDblockID on the distributed data storage system based on its being recently "re-written."

One of the key advantages of the disclosed optimized deduplication scheme is that it continues to operate throughout the distributed data storage system even if storage proxies and/or metadata-hosting nodes are down. Thus, storage proxies and/or metadata nodes that are down cannot affect the expiry-based aging of deduplicated data blocks going on in the rest of the system. The present solution guarantees that stale references to DDblockIDs that may be lingering in these non-functional components cannot prevent a particular DDblockID from being discarded. When a storage proxy or metadata subsystem revives after one or more discard cycles, its local index (e.g., DDCache, DDInfo) indicates that many, if not all, incoming data blocks are expired, because expiry epochs have not been updated while down. This triggers a check-in with an operational metadata node as explained above. The check-in sets the record straight according to current expiry information at the working metadata node, handles the data block appropriately (e.g., new add vs. deduplicated), and provides an update to the newly revived component if needed. This scheme guarantees that stale data blocks will not be mistakenly referenced by components that revive with out-of-date tracking indexes. This aspect provides resiliency to the distributed data storage system without preventing space reclamation.

In sum, the present application discloses a technological improvement that enables system-wide deduplication with block-level expiry granularity. The useful life of each deduplicated data block is based on expiry parameters that relate to backup frequencies of the virtual disks referencing the data block, thus guaranteeing that data blocks are kept around between full backup cycles and are extended if still current. Blocks are retained as long as needed to bridge the gap between sparser backup operations. Tracking data structures are updated only as needed, thus saving processing cycles and network bandwidth. Moreover, the present solution guarantees that stale references to DDblockIDs lingering in non-functional components cannot dictate whether a particular DDblockID is discarded.

BRIEF DESCRIPTION OF THE DRAWINGS

FIG. 1C is a block diagram depicting certain subsystems of the storage service of distributed data storage system 100, according to an illustrative embodiment.

FIG. 1G is a block diagram illustrating a backup configuration that depicts an illustrative data storage management system using distributed data storage system 100 for storing secondary (backup) copies according to an illustrative embodiment.

FIG. 2A is a block diagram depicting components that play a role in the present deduplication solution according to an illustrative embodiment.

FIG. 2B is a block diagram depicting components that play a role in the present deduplication solution according to an illustrative embodiment.

FIG. 2C depicts an illustrative embodiment of a column family (e.g., DDCache, DDInfo) for associating hash values with corresponding DDblockID and associated expiry epoch.

FIG. 2D depicts an illustrative column family for tracking write requests received by storage proxies, e.g., DDTracker.

FIG. 2E depicts an illustrative column family that is updated during each discard preparation stage based at least in part on scanning and processing DDTracker information, e.g., DDRefCount.

FIG. 2F depicts an illustrative column family that assigns the workload of scanning DDTracker column families for the purpose of updating DDRefCount.

FIG. 2G depicts an illustrative column family that comprises DDblockID discard lists.

DETAILED DESCRIPTION

Figure 1A:
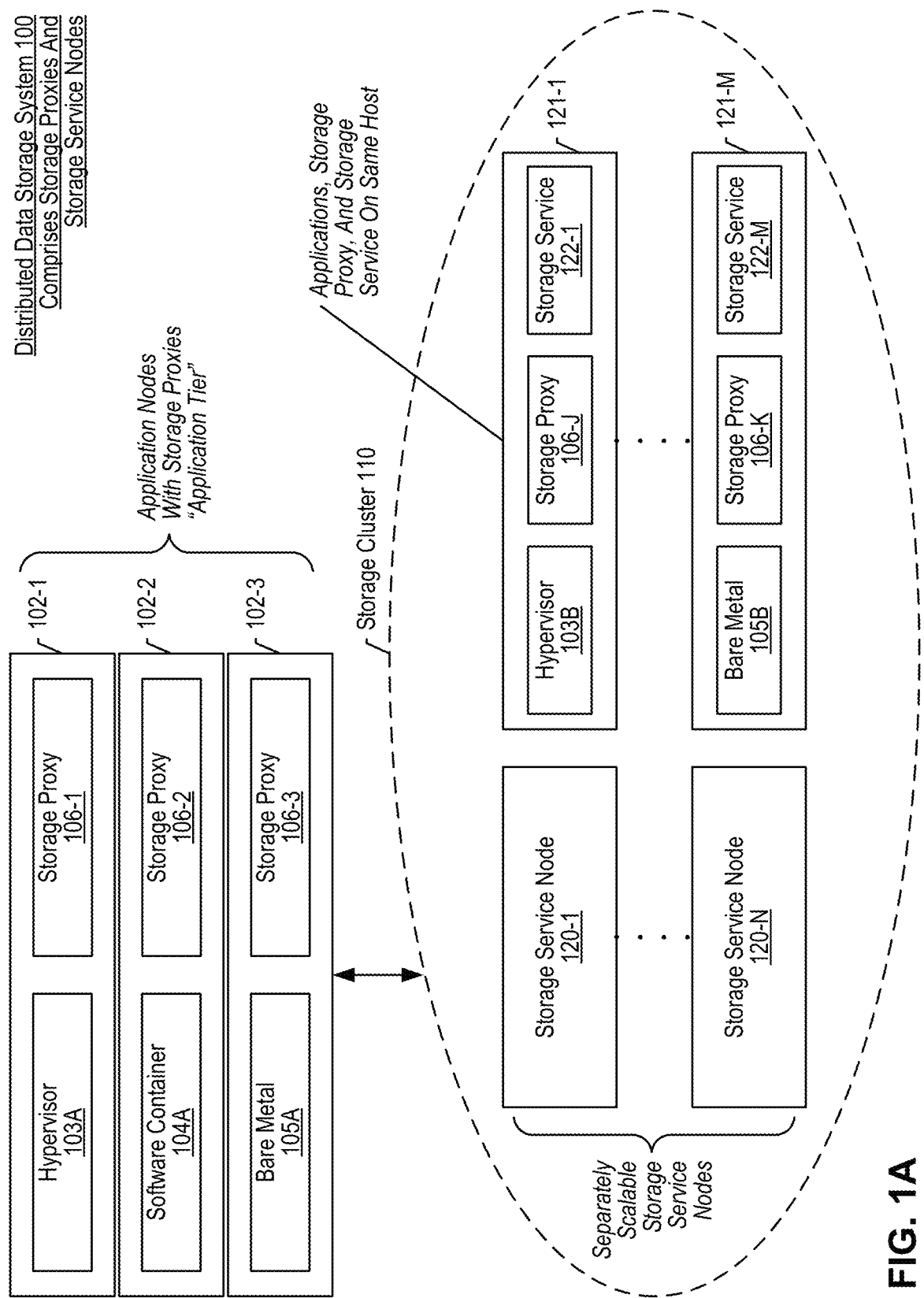
FIG. 1A is a block diagram depicting a distributed data storage system 100 according to an illustrative embodiment.

Detailed descriptions and examples of systems and methods according to one or more illustrative embodiments of the present invention may be found in the section entitled OPTIMIZED DEDUPLICATION BASED ON BACKUP FREQUENCY IN A DISTRIBUTED DATA STORAGE SYSTEM, as well as in the section entitled Example Embodiments, and also in FIGS. 1G-7 herein. Furthermore, components and functionality for optimizing deduplication in a distributed data storage system may be configured and/or incorporated into the distributed data storage system described herein in FIGS. 1A-1F.

Various embodiments described herein are intimately tied to, enabled by, and would not exist except for, computer technology. For example, hashing, analyzing, and transmitting data among the disclosed components described herein cannot reasonably be performed by humans alone, without the computer technology upon which they are implemented.

Generally, the systems and associated components described herein may be compatible with and/or provide at least some of the functionality of the systems and corresponding components described in one or more of the following U.S. patents and patent applications assigned to Commvault Systems, Inc., each of which is hereby incorporated by reference in its entirety herein.

| Title | USPTO Serial No. | U.S. Pat. No. | Filing Date |
|---|---|---|---|
| STORAGE SYSTEM FOR PROVISIONING AND STORING DATA TO A VIRTUAL DISK | 14/322813 | 10,067,722 | Jul. 2, 2014 |
| METHOD FOR WRITING DATA TO A VIRTUAL DISK USING A CONTROLLER VIRTUAL MACHINE AND DIFFERENT STORAGE AND COMMUNICATION PROTOCOLS | 14/322832 | 9,875,063 | Jul. 2, 2014 |
| DISK FAILURE RECOVERY FOR VIRTUAL DISK WITH POLICIES | 14/322850 | 9,424,151 | Jul. 2, 2014 |
| CREATING AND REVERTING TO A SNAPSHOT OF A VIRTUAL DISK | 14/322855 | 9,558,085 | Jul. 2, 2014 |
| CLONING A VIRTUAL DISK IN A STORAGE PLATFORM | 14/322867 | 9,798,489 | Jul. 2, 2014 |
| WRITING TO A STORAGE PLATFORM INCLUDING A PLURALITY OF STORAGE CLUSTERS | 14/322868 | 9,483,205 | Jul. 2, 2014 |
| TIME STAMP GENERATION FOR VIRTUAL DISKS | 14/322871 | 9,411,534 | Jul. 2, 2014 |
| METHOD FOR WRITING DATA TO VIRTUAL DISK USING A CONTROLLER VIRTUAL MACHINE AND DIFFERENT STORAGE AND COMMUNICATION PROTOCOLS ON A SINGLE STORAGE PLATFORM | 14/684086 | 9,864,530 | Apr. 10, 2015 |
| DYNAMICALLY SPLITTING A RANGE OF A NODE IN A DISTRIBUTED HASH TABLE | 14/723380 | Abandoned | May 27, 2015 |
| STORAGE SYSTEM WITH VIRTUAL DISKS | PCT/US2015/38687 | Expired | Jun. 30, 2015 |
| GLOBAL DE-DUPLICATION OF VIRTUAL DISKS IN A STORAGE PLATFORM | 15/155838 | 10,846,024 | May 16, 2016 |
| DE-DUPLICATION OF CLIENT-SIDE DATA CACHE FOR VIRTUAL DISKS | 15/156015 | 10,795,577 | May 16, 2016 |
| PERSISTENT RESERVATIONS FOR VIRTUAL DISK USING MULTIPLE TARGETS | 15/163446 | 10,248,174 | May 24, 2016 |
| SYNCHRONIZATION OF METADATA IN A DISTRIBUTED STORAGE SYSTEM | 15/834921 | 10,740,300 | Dec. 7, 2017 |
| IN-FLIGHT DATA ENCRYPTION/DECRYPTION FOR A DISTRIBUTED STORAGE PLATFORM | 15/912374 | 10,848,468 | Mar. 5, 2018 |
| PERSISTENT RESERVATIONS FOR VIRTUAL DISK USING MULTIPLE TARGETS | 16/274014 | 10,691,187 | Feb. 12, 2019 |
| DISTRIBUTED DATA STORAGE SYSTEM USING ERASURE CODING ON STORAGE NODES FEWER THAN DATA PLUS PARITY FRAGMENTS | 63/053414 | | Jul. 17, 2020 |
| DISTRIBUTED DATA STORAGE SYSTEM USING ERASURE CODING ON STORAGE NODES FEWER THAN DATA PLUS PARITY FRAGMENTS | 63/065722 | | Aug. 14, 2020 |
| OPTIMIZED DEDUPLICATION BASED ON BACKUP FREQUENCY IN A DISTRIBUTED DATA STORAGE SYSTEM | 63/070162 | | Aug. 25, 2020 |
| ANTI-ENTROPY-BASED METADATA RECOVERY IN A STRONGLY CONSISTENT DISTRIBUTED DATA STORAGE SYSTEM | 63/081,503 | | Sep. 22, 2020 |
| COMMISSIONING AND DECOMMISSIONING METADATA NODES IN A RUNNING DISTRIBUTED DATA STORAGE SYSTEM | 63/082624 | | Sep. 24, 2020 |
| CONTAINER DATA MOVER FOR MIGRATING DATA BETWEEN DISTINCT DISTRIBUTED DATA STORAGE SYSTEMS INTEGRATED WITH APPLICATION ORCHESTRATORS | 63/082631 | | Sep. 24, 2020 |

Distributed Data Storage System

An example embodiment of the disclosed distributed data storage system is the Hedvig Distributed Storage Platform now available from Commvault Systems, Inc. of Tinton Falls, N.J., USA, and thus some of the terminology herein originated with the Hedvig product line.

The illustrative distributed data storage system comprises a plurality of storage service nodes that form a storage cluster. Data reads and writes originating from an application on an application host computing device are intercepted by a storage proxy, which is co-resident with the originating application. The storage proxy performs some pre-processing and analysis functions before making communicative contact with the storage cluster. The system ensures strong consistency of data and metadata written to the storage service nodes.

Terminology For The Distributed Data Storage System

Data and Metadata. To enhance the reader's understanding of the present disclosure, the term "metadata" is distinguished from the term "data" herein, even though both data and metadata comprise information stored on the illustrative distributed data storage system. Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "metametadata."

Storage Service, e.g., Hedvig Storage Service. The storage service is a software component that installs on commodity x86 or ARM servers to transform existing server and storage assets into a fully-featured elastic storage cluster. The storage service may deploy to an on-premise infrastructure, to hosted clouds, and/or to public cloud computing environments to create a single storage cluster.

Storage Service Node (or storage node), e.g., Hedvig Storage Server (HSS), comprises both computing and storage resources that collectively provide storage service. The system's storage service nodes collectively form a storage cluster. One or more of the following storage service subsystems of the storage service may be instantiated at and may operate on a storage service node: (i) distributed fault-tolerant metadata subsystem providing metadata service, e.g., "Hedvig Pages"; (ii) distributed fault-tolerant data subsystem (or data storage subsystem) providing payload data storage, e.g., "Hedvig HBlock"; and (iii) distributed fault-tolerant pod subsystem for generating and maintaining certain system-level information, e.g., "Hedvig HPod." The system stores payload data on certain dedicated storage resources managed by the data storage subsystem, and stores metadata on other dedicated storage resources managed by the metadata subsystem. Thus, another way to distinguish payload data from metadata in the illustrative system is that payload data is stored in and maintained by the data storage subsystem and metadata is stored in and maintained by the metadata subsystem. The pod subsystem, the metadata subsystem, and the data storage subsystem are all partitioned and replicated across various storage service nodes. These subsystems operate as independent services, they need not be co-located on the same storage service node, and they may communicate with a subsystem on another storage service node as needed.

Replica. The distributed data storage system replicates data and metadata across multiple storage service nodes. A "replica" or "replica node" is a storage service node that hosts a replicated copy of data and/or metadata that is also stored on other replica nodes. Illustratively, metadata uses a replication factor of 3, though the invention is not so limited. Thus, with a replication factor of 3 ("RF3"), each portion of metadata is replicated on three distinct metadata nodes across the storage cluster.

Virtual Disk ("vdisk") and Storage Containers. The virtual disk is the unit of storage made visible by system 100 to applications and/or application nodes. Every virtual disk provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, virtual disks are distributed and fault-tolerant.

Storage Pools. Storage pools are logical groupings of physical disks/drives in a storage service node and are configured as the protection unit for disk/drive failures and rebuilds. Within a replica, one or more storage containers are assigned to a storage pool. A typical storage service node will host two to four storage pools.

Metadata Node. An instance of the metadata subsystem executing on a storage service node is referred to as a metadata node that provides "metadata service." The metadata subsystem executing on a storage service node stores metadata at the storage service node. The metadata node communicates with one or more other metadata nodes to provide a system-wide metadata service. The metadata subsystem also communicates with pod and/or data storage subsystems at the same or other storage service nodes. Some metadata nodes are designated owners of certain virtual disks whereas others are replicas but not owners. Owner nodes are invested with certain functionality for managing the owned virtual disk.

Metadata Node Identifier or Storage Identifier (SID) is a unique identifier of the metadata service instance on a storage service node, i.e., the unique system-wide identifier of a metadata node.

Storage Proxy. Each storage proxy is a lightweight software component that deploys at the application tier, i.e., on application servers or hosts. A storage proxy may be implemented as a virtual machine (VM) or as a software container (e.g., Docker), or may run on bare metal to provide storage access to any physical host or VM in the application tier. As noted, the storage proxy intercepts reads and writes issued by applications and directs input/output (I/O) requests to the relevant storage service nodes.

Erasure Coding (EC). In some embodiments, the illustrative distributed data storage system employs erasure coding rather than or in addition to replication. EC is one of the administrable attributes for a virtual disk. The default EC policy is (4,2), but (8,2) and (8,4) are also supported if a sufficient number of storage service nodes are available. The invention is not limited to a particular EC policy unless otherwise noted herein.

FIG. 1A is a block diagram depicting a distributed data storage system 100 according to an illustrative embodiment. The figure depicts: a plurality of application nodes 102 that form an "application tier," each application node comprising a storage proxy 106 and one of components 103A, 104A, and 105A; and a storage cluster 110 comprising a plurality of separately scalable storage service nodes 120 and a plurality of specially-equipped compute hosts 121.

Distributed data storage system 100 (or system 100) comprises storage proxies 106 and storage cluster 110. System 100 flexibly leverages both hyperscale and hyperconverged deployment options, sometimes implemented in the same storage cluster 110 as depicted here. Hyperscale deployments scale storage resources independently from the application tier, as shown by storage service nodes 120 (e.g., 120-1 . . . 120-N). In such hyperscale deployments, storage capacity and performance scale out horizontally by adding commodity servers running the illustrative storage service; application nodes (or hosts) 102 scale separately along with storage proxy 106. On the other hand, hyperconverged deployments scale compute and storage in lockstep, with workloads and applications residing on the same physical nodes as payload data, as shown by compute hosts 121. In such hyperconverged deployments, storage proxy 106 and storage service software 122 are packaged and deployed as VMs on a compute host 121 with a hypervisor 103 installed. In some embodiments, system 100 provides plug-ins for hypervisor and virtualization tools, such as VMware vCenter, to provide a single management interface for a hyperconverged solution.

System 100 provides enterprise-grade storage services, including deduplication, compression, snapshots, clones, replication, auto-tiering, multitenancy, and self-healing of both silent corruption and/or disk/node failures to support production storage operations, enterprise service level agreements (SLAs), and/or robust storage for backed up data (secondary copies). Thus, system 100 eliminates the need for enterprises to deploy bolted-on or disparate solutions to deliver a complete set of data services. This simplifies infrastructure and further reduces overall Information Technology (IT) capital expenditures and operating expenses. Enterprise storage capabilities can be configured at the granularity of a virtual disk, providing each data originator, e.g., application, VM, and/or software container, with its own unique storage policy. Every storage feature can be switched on or off to fit the specific needs of any given workload. Thus, the granular provisioning of features empowers administrators to avoid the challenges and compromises of "one size fits all" storage and helps effectively support business SLAs, while decreasing operational costs.

System 100 inherently supports multi-site availability, which removes the need for additional costly disaster recovery solutions. The system provides native high availability storage for applications across geographically dispersed data centers by setting a unique replication policy and replication factor at the virtual disk level.

System 100 comprises a "shared-nothing" distributed computing architecture in which each storage service node is independent and self-sufficient. Thus, system 100 eliminates any single point of failure, allows for self-healing, provides non-disruptive upgrades, and scales indefinitely by adding more storage service nodes. Each storage service node stores and processes metadata and/or payload data, then communicates with other storage service nodes for data/metadata distribution according to the replication factor.

Storage efficiency in the storage cluster is characterized by a number of features, including: thin provisioning, deduplication, compression, compaction, and auto-tiering. Each virtual disk is thinly provisioned by default and does not consume capacity until data is written therein. This space-efficient dynamic storage allocation capability is especially useful in DevOps environments that use Docker, OpenStack, and other cloud platforms where volumes do not support thin provisioning inherently, but can support it using the virtual disks of system 100. System 100 provides inline global deduplication that delivers space savings across the entire storage cluster. Deduplication is administrable at the virtual disk level to optimize I/O and lower the cost of storing data. As writes occur, the system 100 calculates the unique fingerprint of data blocks and replaces redundant data with a small pointer. The deduplication process can be configured to begin at storage proxy 106, improving write performance and eliminating redundant data transfers over the network. System 100 provides inline compression administrable at the virtual disk level to optimize capacity usage. The system stores only compressed data on the storage service nodes. Illustratively, the Snappy compression library is used, but the invention is not limited to this implementation. To improve read performance and optimize storage space, the illustrative system periodically performs garbage collection to compact redundant blocks and generate large sequential chunks of data. The illustrative system balances performance and cost by supporting tiering of data among high-speed SSDs and lower-tier persistent storage technologies.

Application node (or host) 102 (e.g., 102-1, 102-2, 102-3) is any computing device, comprising one or more hardware processors and computer memory for executing computer programs, that generates and/or accesses data stored in storage cluster 110. Application(s) (not shown here but see, e.g., applications 132 in FIG. 1B) executing on an application node 102 use storage cluster 110 as a data storage resource. Application node 102 can take the form of: a bare metal host 105A for applications with storage proxy 106-3; a virtual machine server with hypervisor 103A and storage proxy 106-1; a container host hosting software container 104A and storage proxy 106-2; and/or another computing device configuration equipped with a storage proxy 106.

Hypervisor 103 (e.g., 103A, 103B) is any hypervisor, virtual machine monitor, or virtualizer that creates and runs virtual machines on a virtual machine server or host. Software container 104A is any operating system virtualization software that shares the kernel of the host computing device (e.g., 102, 121) that it runs on and allows multiple isolated user space instances to co-exist. Docker is an example of software container 104A. Bare metal 105A refers to application node 102-3 running as a traditional computing device without virtualization features. Components 103, 104A, and 105A/B are well known in the art.

Storage proxy 106 (e.g., 106-1, 106-2, 106-3, 106-J . . . 106-K) is a lightweight software component that deploys at the application tier, i.e., on application nodes 102 and/or compute hosts 121. A storage proxy may be implemented as a virtual machine 106-1, as a software container (e.g., Docker) 106-2, and/or running on bare metal (e.g., 106-3) to provide storage access to any physical host or VM in the application tier. The storage proxy acts as a gatekeeper for all I/O requests to virtual disks configured at storage cluster 110. It acts as a storage protocol converter, load balances I/O requests to storage service nodes, caches data fingerprints, and performs certain deduplication functions. Storage protocols supported by storage proxy 106 include Internet Small Computer Systems Interface (iSCSI), Network File System (NFS), Server Message Block (SMB2) or Common Internet File System (CIFS), Amazon Simple Storage Service (S3), OpenStack Object Store (Swift), without limitation. The storage proxy runs in user space and can be managed by any virtualization management or orchestration tool. With storage proxies 106 that run in user space, the disclosed solution is compatible with any hypervisor, software container, operating system, or bare metal computing environment at the application node. In some virtualized embodiments where storage proxy 106 is deployed on a virtual machine, the storage proxy may be referred to as a "controller virtual machine" (CVM) in contrast to application-hosting virtual machines that generate data for and access data at the storage cluster.

Storage cluster 110 comprises the actual storage resources of system 100, such as storage service nodes 120 and storage services 122 running on compute hosts 121. In some embodiments, storage cluster 110 is said to comprise compute hosts 121 and/or storage service nodes 120.

Storage service node 120 (e.g., 120-1 . . . 120-N) is any commodity server configured with one or more x86 or ARM hardware processors and with computer memory for executing the illustrative storage service, which is described in more detail in FIG. 1C. Storage service node 120 also comprises storage resources as described in more detail in FIG. 1D. By running the storage service, the commodity server is transformed into a full-featured component of storage cluster 110. System 100 may comprise any number of storage service nodes 120.

Compute host 121 (e.g., 121-1 . . . 121-M) is any computing device, comprising one or more hardware processors and computer memory for executing computer programs, that comprises the functional components of an application node 102 and of a storage service node 120 in a "hyperconverged" configuration. In some embodiments, compute hosts 121 are configured, sometimes in a group, within an appliance such as the Commvault Hyperscale™ X backup appliance from Commvault Systems Inc., of Tinton Falls, N.J., USA.

Figure 1B:
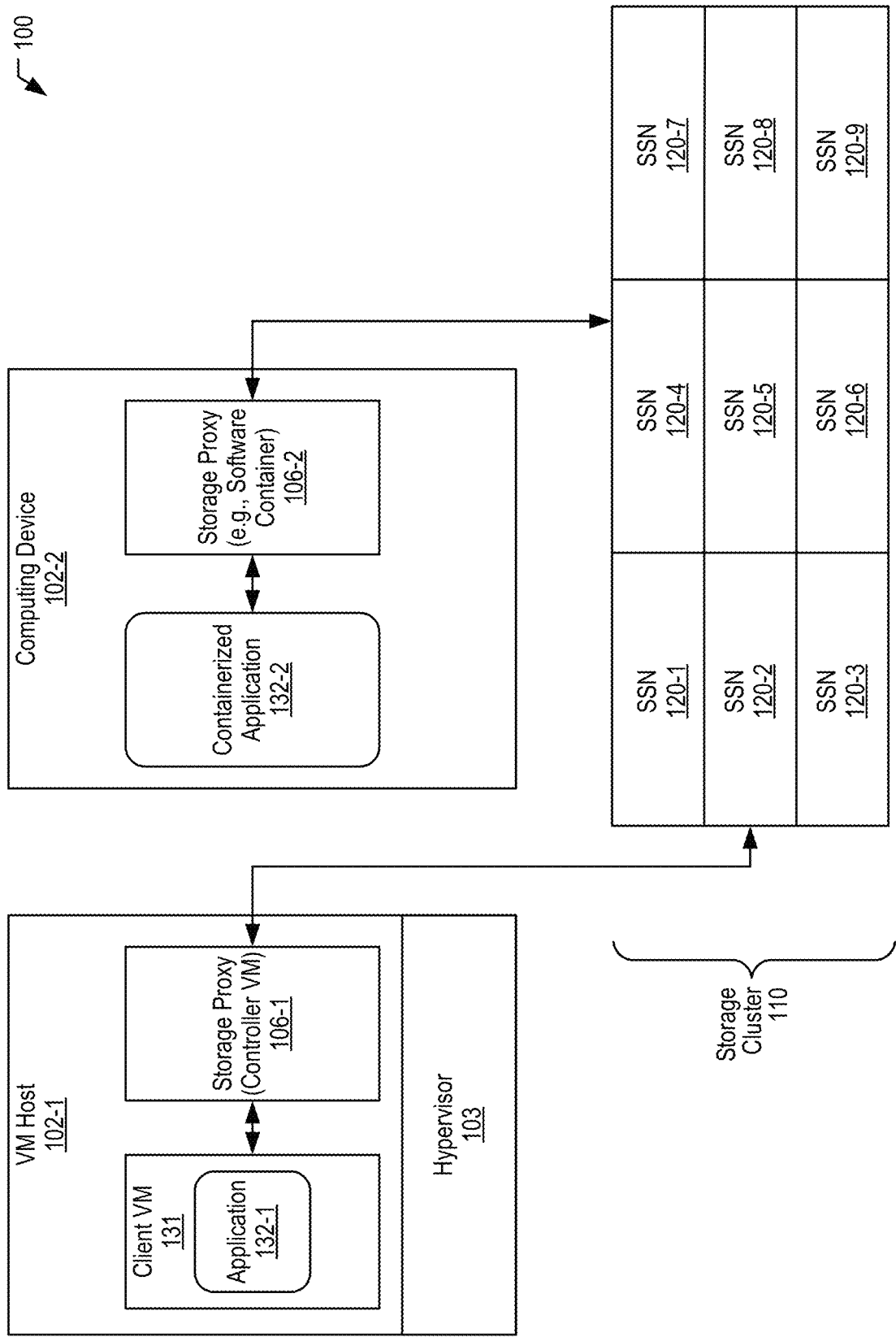
FIG. 1B is a block diagram illustrating some details of distributed data storage system 100 comprising separately scalable storage service nodes according to an illustrative embodiment.

FIG. 1B is a block diagram illustrating some details of distributed data storage system 100 comprising separately scalable storage service nodes 120 according to an illustrative embodiment. The figure depicts: application node 102-1 embodied as a VM host and hosting hypervisor 103, storage proxy 106-1 embodied as a controller virtual machine, and client VM 131 hosting application 132-1; application node 102-2 hosting containerized storage proxy 106-2 and containerized application 132-2; and storage cluster 110 comprising nine (9) distinct physical storage service nodes 120 (e.g., 120-1 . . . 120-9). Virtual machine hosts, virtual machines, and hypervisors are well known in the art.

Application 132 (e.g., 132-1, 132-2) is any software that executes on its underlying host (e.g., 102-1, 102-2) and performs a function as a result. The application 132 may generate data and/or need to access data which is stored in system 100. Examples of application 132 include email applications, database management applications, office productivity software, backup software, etc., without limitation.

The bi-directional arrows between each storage proxy 106 and a storage service node 120 depict the fact that communications between applications 132 and storage cluster 110 pass through storage proxies 106, each of which identifies a proper storage service node 120 to communicate with for the present transaction, e.g., storage service node 120-2 for storage proxy 106-1, storage service node 120-4 for storage proxy 106-2.

FIG. 1C is a block diagram depicting certain subsystems of the storage service of distributed data storage system 100, according to an illustrative embodiment. Depicted here are: storage proxy 106; application 132; and a storage service node 120 comprising a pod subsystem 130 (e.g., Hedvig "HPOD"), a metadata subsystem 140 (e.g., Hedvig "PAGES"), and a data storage subsystem 150 (e.g., Hedvig "HBLOCK"). Although storage service node 120 as depicted here comprises an instance of all three storage service subsystems, any given storage service node 120 need not comprise all three subsystems. Thus, a subsystem running on a given storage service node may communicate with one or more subsystems on another storage service node as needed to complete a task or workload.

Storage proxy 106 intercepts reads and writes issued by applications 132 that are targeted to particular virtual disks configured in storage cluster 110. Storage proxy 106 provides native block, file, and object storage protocol support, as follows:

Block storage—system 100 presents a block-based virtual disk through a storage proxy 106 as a logical unit number (LUN). Access to the LUN, with the properties applied during virtual disk provisioning, such as compression, deduplication and replication, is given to a host as an iSCSI target. After the virtual disk is in use, the storage proxy translates and relays all LUN operations to the underlying storage cluster.

File storage—system 100 presents a file-based virtual disk to one or more storage proxies 106 as an NFS export, which is then consumed by the hypervisor as an NFS datastore. Administrators can then provision VMs on that NFS datastore. The storage proxy acts as an NFS server that traps NFS requests and translates them into the appropriate remote procedure call (RPC) calls to the backend storage service node.

Figure 1D:
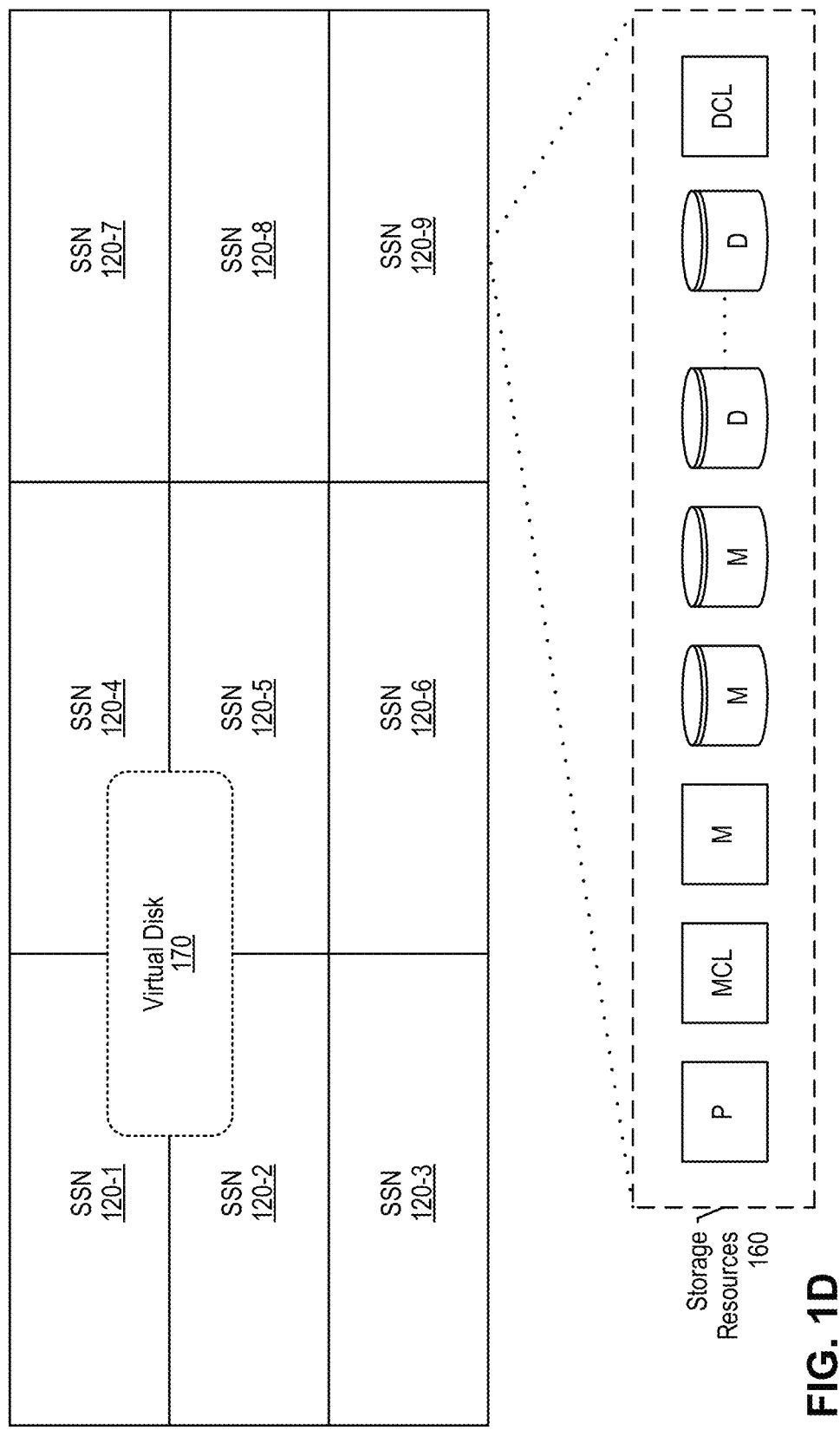
FIG. 1D is a block diagram depicting a virtual disk distributed across a plurality of storage service nodes and also depicting a plurality of storage resources available at each storage service node according to an illustrative embodiment.

Object storage—buckets created via the Amazon S3 API, or storage containers created via the OpenStack Swift API, are translated via the storage proxies 106 and internally mapped to virtual disks 170 (shown in FIG. 1D). The storage cluster 110 acts as the object (S3/Swift) target, which client applications 132 can utilize to store and access objects.

Storage Proxy 106 comprises one or more caches that enable distributed operations and the performing of storage system operations locally at the application node 102 to accelerate read/write performance and efficiency. An illustrative metacache stores metadata locally at the storage proxy, preferably on SSDs. This cache eliminates the need to traverse the network for metadata lookups, leading to substantial read acceleration. For virtual disks provisioned with client-side caching, an illustrative block cache stores data blocks to local SSD drives to accelerate reads. By returning blocks directly from the storage proxy, read operations avoid network hops when accessing recently used data. For virtual disks provisioned with deduplication, an illustrative dedupe cache resides on local SSD media and stores fingerprint information of certain data blocks written to storage cluster 110. Based on this cache, the storage proxy determines whether data blocks have been previously written and if so, avoids re-writing these data blocks again. Storage proxy 106 first queries the dedupe cache and if the data block is a duplicate, storage proxy 106 updates metadata subsystem 140 to map the new data block(s) and acknowledges the write to originating application 132. Otherwise, storage proxy 106 queries metadata subsystem 140 and if the data block was previously written to storage cluster 110, the dedupe cache and metadata subsystem 140 are updated accordingly, with an acknowledgement to originating application 132. Unique new data blocks are written to the storage cluster as new payload data. More details on reads and writes are given in FIGS. 1E and 1F.

A simplified use case workflow comprises: 1. A virtual disk 170 is administered with storage policies via a web-based user interface, a command line interface, and/or a RESTful API (representational state transfer application programming interface). 2. Block and file virtual disks are attached to a storage proxy 106, which presents the storage resource to application hosts, e.g., 102. For object storage, applications 132 directly interact with the virtual disk via Amazon S3 or OpenStack Swift protocols. 3. Storage proxy 106 intercepts application 132 I/O through the native storage protocol and communicates it to the underlying storage cluster 110 via remote procedure calls (RPCs). 4. The storage service distributes and replicates data throughout the storage cluster based on virtual disk policies. 5. The storage service conducts background processes to auto-tier and balance across racks, data centers, and/or public clouds based on virtual disk policies.

Pod subsystem 130 maintains certain system-wide information for synchronization purposes and comprises processing and tracking resources and locally stored information. A network of pods 130 throughout storage cluster 110, where each pod comprises three nodes, is used for managing transactions for metadata updates, distributed-atomic-counters as a service, tracking system-wide timeframes such as generations and epochs, etc. More details on the pod subsystem may be found in U.S. Pat. No. 9,483,205 B2, which is incorporated by reference in its entirety herein.

Metadata subsystem 140 comprises metadata processing resources and partitioned replicated metadata stored locally at the storage service node. Metadata subsystem 140 receives, processes, and generates metadata. Metadata in system 100 is partitioned and replicated across a plurality of metadata nodes. Typically, metadata subsystem 140 is configured with a replication factor of 3 (RF3), and therefore many of the examples herein will include 3-way replication scenarios, but the invention is not so limited. Each metadata subsystem 140 tracks the state of data storage subsystems 150 and of other metadata subsystems 140 in storage cluster 110 to form a global view of the cluster. Metadata subsystem 140 is responsible for optimal replica assignment and tracks writes in storage cluster 110.

Metadata synchronization logic (or "anti-entropy engine" (AE) not shown here) runs in metadata subsystem 140. The metadata synchronization logic compares replicas of metadata across metadata nodes and ensures that the replicas agree on a superset of the metadata therein to avoid losing metadata. During storage and compaction of metadata-carrying string-sorted tables (SSTs), a consistent file identification scheme is used across all metadata nodes. When an application node writes to and reads from a virtual disk on distributed data storage system 100, metadata is generated and stored in replicas on different metadata nodes. A modified log-structured merge tree is used to store and compact the metadata SST files. A fingerprint file is created for each metadata SST file that includes a start-length-hash value triple for each region of the metadata SST file. To synchronize, fingerprint files of two metadata SST files are compared, and if any hash values are missing from a fingerprint file then key-value-timestamp triples corresponding to these missing hash values are sent to the metadata SST file that is missing them. An example of metadata synchronization logic is described in U.S. Pat. No. 10,740,300, which is incorporated by reference in its entirety herein.

Data storage subsystem 150 receives, processes, and stores payload data written to storage cluster 110. Thus, data storage subsystem 150 is responsible for replicating data to other data storage subsystems 150 on other storage service nodes and striping data within and across storage pools. Data storage subsystem 150 comprises storage processing for payload data blocks (e.g., I/O, compaction, garbage collection, etc.) and stores partitioned replicated payload data at the storage service node.

The bold bi-directional arrows in the present figure show that metadata is communicated between storage proxy 106 and metadata subsystem 140, whereas data blocks are transmitted to/from data storage subsystem 150. Depending on the configuration, metadata subsystem 140 may operate on a first storage service node 120 or storage service 122 and data storage subsystem 150 may operate on another distinct storage service node 120 or storage service 122. See also FIGS. 1E and 1F.

FIG. 1D is a block diagram depicting a virtual disk distributed across a plurality of storage service nodes and also depicting a plurality of storage resources available at each storage service node according to an illustrative embodiment. The present figure depicts: nine storage service nodes 120 (120-1 . . . 120-09); a virtual disk 170 that comprises data distributed over four of the storage service nodes—120-1, 120-2, 120-4, and 120-5; and storage resources 160 configured within storage service node 120-9.

Each storage service node 120 (or compute host 121) is typically configured with computing resources (e.g., hardware processors and computer memory) for providing storage services and with a number of storage resources 160, e.g., hard disk drives (HDD) shown here as storage disk shapes, solid state storage drives (SSD) (e.g., flash memory technology) shown here as square shapes, etc. The illustrative system uses commit logs, which are preferably stored on SSD before they are flushed to another disk/drive for persistent storage. Metadata commit logs are stored on dedicated metadata-commit-log drives "MCL", whereas payload-data commit logs are stored on distinct dedicated data-commit-log drives "DCL." As an example depicted in the present figure, pod system information is stored in storage resource "P" which is preferably SSD technology for faster read/write performance; the metadata commit log is stored in storage resource "MCL" which is preferably SSD technology; metadata is then flushed from the commit log to persistent storage "M" (SSD and/or HDD); the data commit log is stored in storage resource "DCL" which is preferably SSD technology; payload data is then flushed from the data commit log to persistent storage "D" (typically HDD). The storage resources 160 depicted in the present figures are shown here as non-limiting examples to ease the reader's understanding; the numbers and types of storage technologies among storage resources 160 will vary according to different implementations.

To accelerate read operations, client-side caching of data is used on SSDs accessible by storage proxy 106. Data is also cached on SSDs at storage service nodes. For caching, the system supports the use of Peripheral Component Interconnect Express (PCIe) and Non-Volatile Memory Express (NVMe) SSDs. All writes are executed in memory and flash (SSD/NVMe) and flushed sequentially to persistent storage. Persistent storage uses flash technology (e.g., multi-level cell (MLC) and/or 3D NAND SSD) and/or spinning disk technology (e.g., HDD)). Options are administrable at the virtual disk level.

Virtual disk ("vdisk") 170 is the data storage representation of system 100 that is visible to and accessible by applications 132 as data storage resources. Virtual disk 170 is also referred to herein as "user virtual disk" 170 to reflect that it is visible to applications 132 as a data storage resource. In other words, each application 132 will use one or more virtual disks 170 for data storage without having knowledge of how system 100 as a whole is organized and configured. Every virtual disk 170 provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, the virtual disks are distributed and fault-tolerant. Notably, the replication factor alone (e.g., RF3) does not limit how many storage service nodes 120 may comprise payload data of a given virtual disk 170. Thus, different containers of the virtual disk may be stored and replicated on different storage service nodes, adding up to more total storage service nodes associated with the virtual disk than the replication factor of the virtual disk.

Any number of virtual disks 170 may be spun up, each one thinly provisioned and instantly available. Illustrative user-configurable attributes for virtual disk 170 include without limitation: Name—a unique name to identify the virtual disk. Size—to set the desired virtual disk size. System 100 supports single block and NFS virtual disks of unlimited size. Disk Type—to specify the type of storage protocol to use for the virtual disk: block or file (NFS). Object containers/buckets are provisioned directly from OpenStack via Swift, via the Amazon S3 API, etc. Workload Type—for NFS disk type, options include default, proprietary, or object storage target (OST) workload types. For proprietary and OST, if Enable Deduplication is selected, a Retention Policy can be added as well. For block disk type, the only option is default. Retention Policy—specifies a duration for proprietary and OST workloads, e.g., two weeks, one month, etc. Encryption—to encrypt both data at rest and data in flight for the virtual disk. Enable Deduplication—to enable inline global deduplication. Clustered File System—to indicate that the virtual disk will be used with a clustered file system. When selected, system 100 enables concurrent read/write operations from multiple VMs or hosts. Description—to provide an optional brief description of the virtual disk. Compressed—to enable virtual disk compression to reduce data size. Client-Side Caching—to cache data to local SSD or PCIe devices at the application tier to accelerate read performance. CSV—to enable Cluster Shared Volumes for failover (or high availability) clustering. A CSV is a shared disk containing a Windows NT File System (NTFS) or Resilient File System (ReFS) volume that is made accessible for read and write operations by all nodes within a Windows Server failover cluster. Replication Policy—to set the policy for how data will replicate across the cluster: Agnostic, Rack Aware, or Data Center Aware. Replication Factor (RF)—to designate the number of replicas for each virtual disk. Replication factor is tunable, typically ranging from one to six, without limitation. Block Size—to set a block virtual disk size to 512 bytes, 4k or 64k. File (NFS)-based virtual disks have a standard 512 size, and object-based virtual disks have a standard 64K size. Residence—to select the type of media on which the data is to reside: HDD, SSD. The present figure depicts only one virtual disk 170 for illustrative purposes, but system 100 has no limits on how many virtual disks it may support.

Figure 1E:
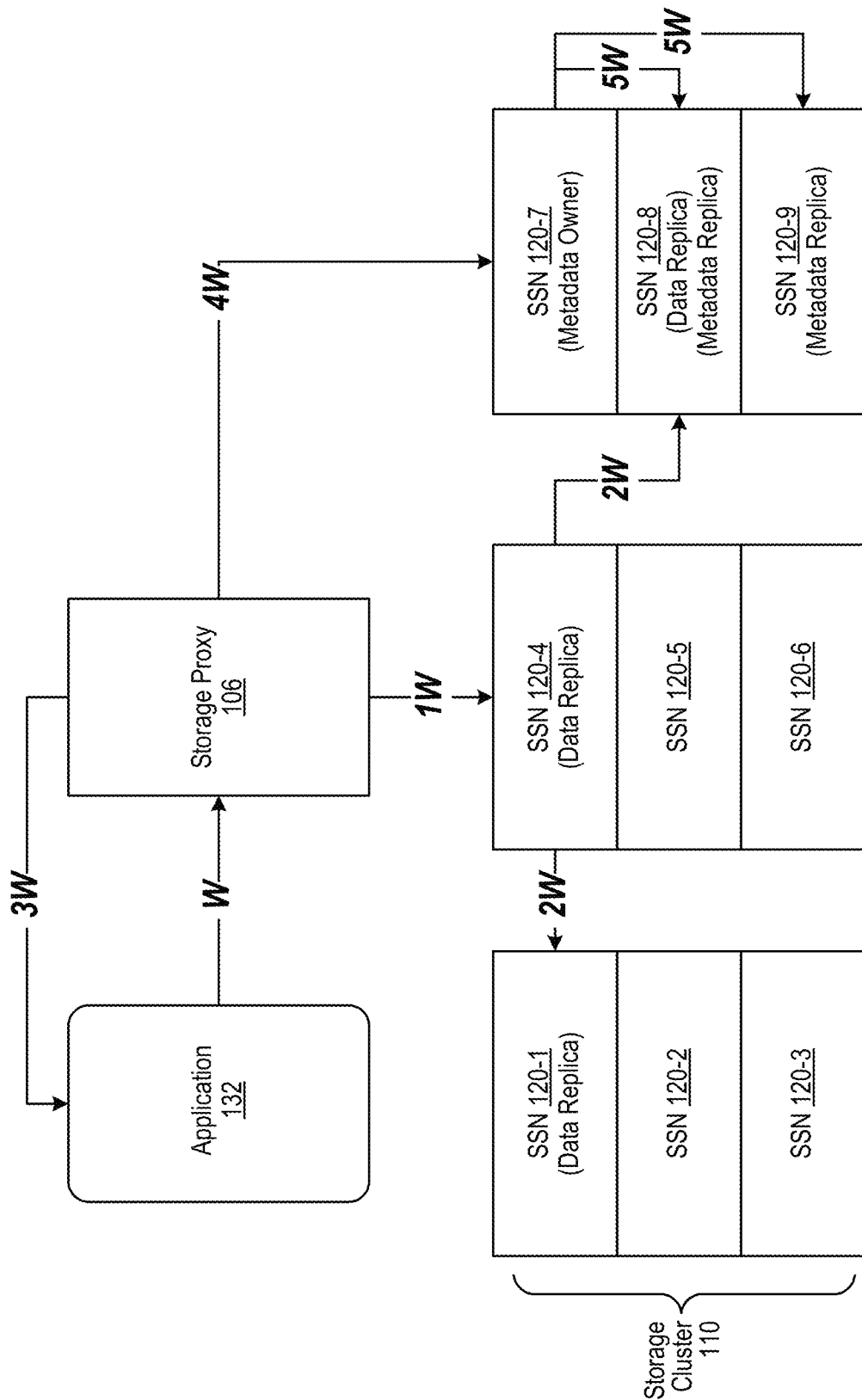
FIG. 1E is a block diagram depicting a typical I/O workflow for write operations originating with an application.

FIG. 1E is a block diagram depicting a typical I/O workflow for write operations originating with an application. This figure depicts an application 132 writing to storage cluster 110, illustratively writing to a virtual disk 170 configured with Replication Factor=3 (RF3).

At step W, storage proxy 106 intercepts a write command issued by application 132, comprising one or more payload data blocks to be written to a virtual disk 170 in storage cluster 110. At step 1W, storage proxy 106 determines the replica nodes 120 for the data blocks to be written and transmits the data blocks to one of the replica nodes 120, e.g., 120-4. If the virtual disk is enabled for deduplication, storage proxy 106 calculates a data block fingerprint, queries the dedupe cache and, if necessary, further queries metadata subsystem 140 (at the virtual disk's metadata owner node, e.g., 120-7), and either makes a metadata update or proceeds with a new write. At step 2W, data storage subsystem 150 on replica node 120-4 receives and writes the data blocks locally and forwards them to other designated replica nodes, e.g., 120-1 and 120-8. At step 3W, storage proxy 106 sends a write acknowledgment back to the originating application 132 after a quorum of data storage subsystem 150 replicas have completed step 2W. For RF3, two acknowledged successful writes are needed from the three (RF3) replicas to satisfy the quorum (RF/2+1=3/2+1=2). Two of the three replicas are written synchronously, and one may be written asynchronously. At step 4W, storage proxy 106 causes an atomic write to be made into metadata subsystem 140 at metadata owner node 120-7, after which the write is deemed successful. At step 5W, metadata subsystem 140 replicates the metadata from node 120-7 to designated metadata replica nodes, e.g., 120-8 and 120-9.

Figure 1F:
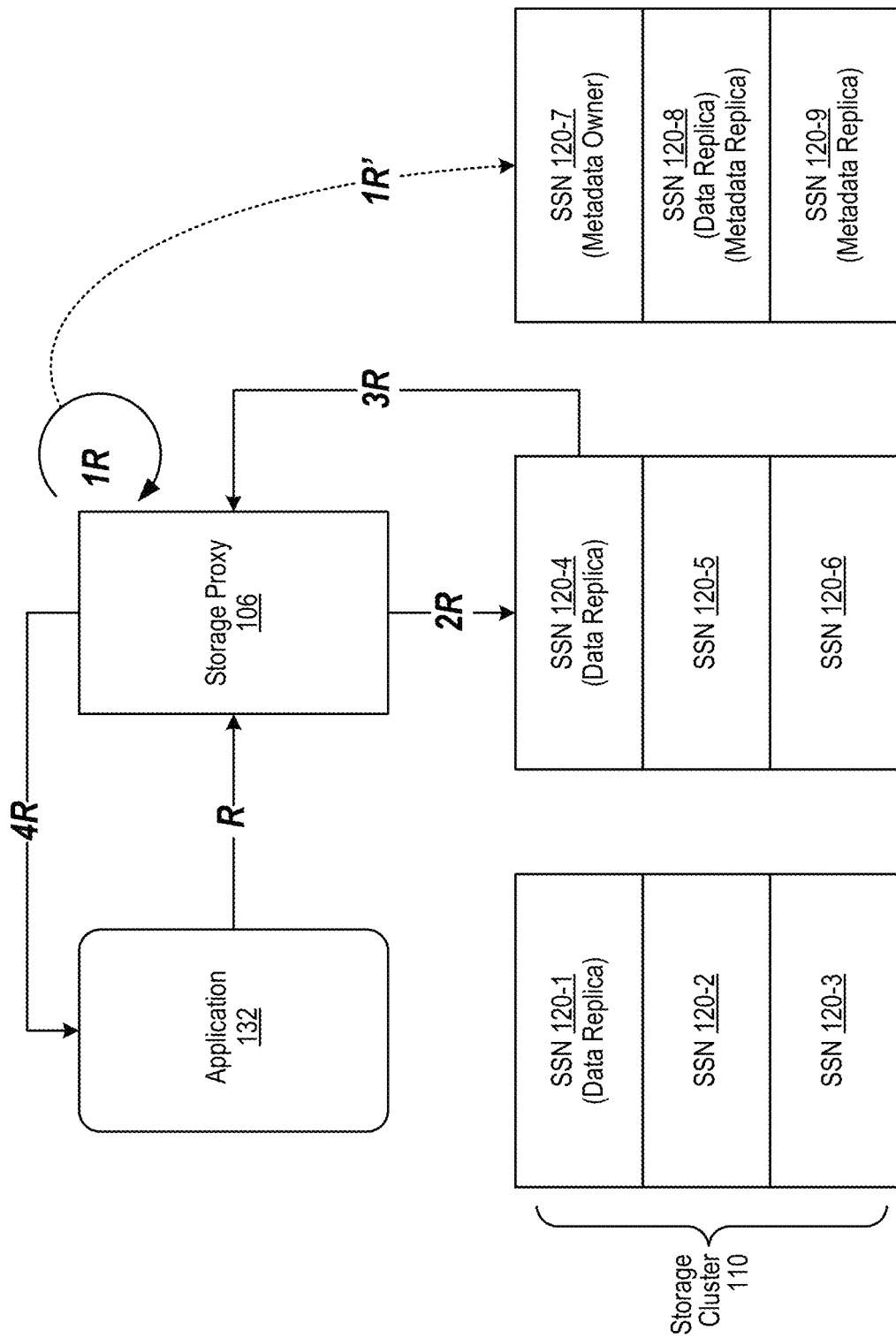
FIG. 1F is a block diagram depicting a typical I/O workflow for read operations originating with an application.

FIG. 1F is a block diagram depicting a typical I/O workflow for read operations originating with an application. This figure depicts an application 132 reading from storage cluster 110, illustratively reading from a virtual disk 170 configured with RF3.

At step R, storage proxy 106 intercepts a read request issued by application 132 for one or more data blocks from a virtual disk 170 in storage cluster 110. At step 1R, storage proxy 106 queries the local metacache for a particular data block to be read and if the information is not found in the local metacache, at step 1R' storage proxy 106 consults metadata subsystem 140 (e.g., at the vdisk's designated metadata owner node 120-7). At step 2R, storage proxy 106 sends the data block details to one of the closest data storage subsystems 150, based on observed latency, e.g., storage service node 120-4. At step 3R, data storage subsystem 150 reads the data block(s) and transmits the block(s) back, if found, to storage proxy 106. If the read operation fails due to any error, the read is attempted from another replica. At step 4R, storage proxy 106 serves the requested data block(s) to application 132. If client-side caching is enabled for the targeted virtual disk 170 during provisioning, storage proxy 106 queries the local block cache at step 1R to fetch the data block(s), and if found therein serves the data block(s) to application 132 at step 4R, thereby bypassing data storage subsystem 150 at the storage service nodes(s) and eliminating the need to traverse the network to reach storage cluster 110.

System Resiliency. System 100 is designed to survive disk, node, rack, and data center outages without application downtime and with minimal performance impact. These resiliency features include: high availability, non-disruptive upgrades (NDU), disk failures, replication, and snapshots and clones.

High availability (HA). A preferable minimum of three storage service node should be provisioned for an implementation of the illustrative system. Redundancy can be set as agnostic, at the rack level, or at data center level. The system initiates transparent failover in case of failure. During node, rack, or site failures, reads and writes continue as usual from/to remaining operational replicas. To protect against a single point of failure, storage proxies 106 install as a high availability active/passive pair ("HA pair," not shown). A virtual IP address (VIP) assigned to the HA pair redirects traffic automatically to the active storage proxy 106 at any given time. If one storage proxy 106 instance is lost or interrupted, operations fail over seamlessly to the passive instance to maintain availability. This happens without requiring intervention by applications, administrators, or users. During provisioning, administrators can indicate that an application host 102/121 will use a clustered file system. This automatically sets internal configuration parameters to ensure seamless failover when using VM migration to a secondary physical host running its own storage proxy 106. During live VM migration, such as VMware vMotion or Microsoft Hyper-V, any necessary block and file storage "follows" guest VMs to another host.

Non-disruptive upgrades (NDUs). The illustrative system supports non-disruptive software upgrades by staging and rolling the upgrade across individual components using the highly available nature of distributed data storage system 100 to eliminate any downtime or data unavailability. Storage service nodes 120 and storage services 122 undergo upgrades first one node at a time. Meanwhile, any I/O continues to be serviced from alternate available nodes, e.g., replicas. Storage proxies 106 are upgraded next, starting with the passive storage proxy in HA pairs. After the passive storage proxy upgrade is complete, it is made active, and the formerly active storage proxy 106 is upgraded and resumes service as the passive of the HA pair. This process eliminates any interruption to reads or writes during the upgrade procedure.

Disk Failures. The illustrative system supports efficient data and metadata rebuilds that are initiated automatically when there is a disk failure. Payload data is rebuilt from other data replicas and using information in the metadata subsystem. The metadata rebuild self-heals within the metadata service.

Replication. The illustrative system uses a combination of synchronous and asynchronous replication processes to distribute and protect data across the cluster and provide near-zero recovery point objectives (RPO) and recovery time objectives (RTO). For example, two of three replicas are written synchronously, and one is written asynchronously. The system supports any number of active data centers in a single storage cluster 110, using a tunable replication factor and replication policy options. The replication factor designates the number of replicas to create for each virtual disk, and the replication policy defines the destination for the replicas across the cluster. Replicas occur at the storage container level of a virtual disk 170. For example, if a 100 GB virtual disk with RF3 is created, the entire 100 GBs are not stored as contiguous chunks on three storage service nodes. Instead, the 100 GBs are divided among several storage containers, and replicas of each storage container are spread across different storage pools on different storage service nodes within the storage cluster. For additional disaster recovery protection against rack and data center failures, the illustrative system supports replication policies that span multiple racks or data centers using structured IP addressing, DNS naming/suffix, and/or customer-defined snitch endpoints. For "agnostic" replication policies, data is spread across the storage cluster using a best-effort to improve availability. For "rack aware" replication policies, data is spread across as many physically distinct racks as possible within in a single data center. For "data center aware" replication policies, data replicates to additional physical sites, which can include private and/or hosted data centers and public clouds. In a disaster recovery example, where the Replication Policy=Data Center Aware and the Replication Factor=3, the illustrative system divides the data into storage containers and ensures that three copies (RF3) of each storage container are spread to geographically dispersed physical sites, e.g., Data Centers A, B, and C. At any time, if a data copy fails, re-replication is automatically initiated from replicas across the data centers.

Snapshots And Clones. In addition to replication policies, data management tasks include taking snapshots and making "zero-copy" clones of virtual disks. There is no limit to the number of snapshots or clones that can be created. Snapshots and clones are space-efficient, requiring capacity only for changed blocks.

Encryption. The illustrative system provides software-based encryption with the Encrypt360 feature. This enables encryption of data at the point of ingestion (at storage proxy 106). Data encrypted in this way remains protected in flight between storage proxy 106 and storage service nodes 120/ storage service 122, in flight among storage service nodes as part of replication, in-use at storage proxy 106, and at rest while in storage. Any encryption scheme may be implemented, preferably 256-bit AES. Additionally, any third-party key management system can be attached.

Ecosystem Integration. The illustrative system works with and provides a secure distributed data storage system for a variety of data-generating platforms, including systems that generate primary (production) data and systems that generate backup data from primary sources. VMware. The illustrative system features a vCenter plug-in that enables provisioning, management, snapshotting, and cloning of virtual disks 170 directly from the vSphere Web Client. Additionally, the system incorporates support for the VMware vSphere Storage APIs Array Integration (VAAI). Docker. The illustrative system provides persistent storage for Docker software containers through a volume plugin. The volume plugin enables a user to create a persistent Docker volume backed by a virtual disk 170. Different options, such as deduplication, compression, replication factor, and/or block size, may be set for each Docker volume, using "volume options" in the Docker Universal Control Plane (UCP) or using the "docker volume" command line. The virtual disk can then be attached to any host. The volume plugin also creates a file system on this virtual disk and mounts it using the path provided by the user. The file system type can also be configured by the user. All I/O to the Docker volume goes to virtual disk 170. As the software container moves in the environment, virtual disk 170 will automatically be made available to any host, and data will be persisted using the policies chosen during volume creation. For container orchestration platforms, such as Kubernetes and OpenShift, the illustrative system 100 provides persistent storage for software containers through a proprietary dynamic provisioner and via other technologies that interoperate with the orchestration platform(s). OpenStack. The illustrative system delivers block, file, and object storage for OpenStack all from a single platform via native Cinder and Swift integration. The system supports granular administration, per-volume (Cinder) or per-container (Swift), for capabilities such as compression, deduplication, snapshots, and/ or clones. OpenStack administrators can provision the full set of storage capabilities of system 100 in OpenStack Horizon via OpenStack's QoS functionality. As with VMware, administrators need not use system 100's native web user interfaces and/or RESTful API, and storage can be managed from within the OpenStack interface.

Multitenancy. The illustrative system supports the use of rack-aware and data center-aware replication policies for customers who must satisfy regulatory compliance and restrict certain data by region or site. These capabilities provide the backbone of a multitenant architecture, which is supported with three forms of architectural isolation: LUN masking, dedicated storage proxies, and complete physical isolation. Using the LUN masking option, different tenants are hosted on a shared infrastructure with logical separation. Logical separation is achieved by presenting virtual disks only to a certain VM and/or physical application host (IP range). Quality of Service (QoS) is delivered at the VM level. Using the dedicated storage proxies option, storage access is provided with a dedicated storage proxy 106 per tenant. Storage proxies can be deployed on a dedicated physical host or a shared host. This provides storage as a shared infrastructure, while compute is dedicated to each tenant. Quality of Service (QoS) is at the VM level. Using the complete physical isolation option, different tenants are hosted on dedicated storage clusters (each running their own storage service and storage proxies) to provide complete logical and physical separation between tenants. For all of these multitenant architectures, each tenant can have unique virtual disks with tenant-specific storage policies, because the illustrative system configures policies at the virtual disk level. Policies can be grouped to create classes of service (CoS).

Thus, the illustrative distributed data storage system 100 scales seamlessly and linearly from a few nodes to thousands of nodes using virtual disks as the user-visible storage resource provided by the system. Enterprise storage capabilities are configurable at the virtual disk level. The storage service nodes can be configured in a plurality of physical computing environments, e.g., data centers, private clouds, and/or public clouds without limitation. Likewise, the storage proxies may execute in the same or different computing environment from the storage service nodes, e.g., within the same cloud computing environment, different cloud computing environments, different cloud availability zones, and/or in a non-cloud data center, thus enabling cloud-to-cloud and/or multi-cloud services, as well as non-cloud and/or hybrid service environments.

Optimized Deduplication Based on Backup Frequency in a Distributed Data Storage System FIG. 1G is a block diagram illustrating a backup configuration that depicts an illustrative data storage management system using distributed data storage system 100 for storing secondary (backup) copies according to an illustrative embodiment. The figure depicts: storage service nodes 120 configured with a global system deduplication virtual disk 1700; client computing device 1020 hosting application(s) 132 and data agent(s) 1420; backup computing device 1060 hosting media agent(s) 1440 and storage proxy 106; and storage manager 1400. An example of the illustrative data storage management system is the Commvault Complete™ Backup and Recovery software solution from Commvault Systems, Inc. of Tinton Falls, N.J., USA. Hereinafter, secondary copies, which are distinguishable from primary (application-native) data, will be referred to as "backup copies" for simplicity and to ease the reader's understanding of the present disclosure.

Client computing device 1020 and backup computing device 1060 each comprise one or more hardware processors and computer memory for executing computer programs. Likewise, storage manager 1400 is hosted by and/or comprises one or more hardware processors and computer memory for executing computer programs. These components may operate in any computing environment, e.g., non-cloud data center, hybrid cloud, private cloud, and/or public cloud without limitation.

Components of the data storage management system include storage manager 1400, one or more data agents 1420, and one or more media agents 1440. Primary data 1120 generated and used by client applications 132 is captured by a data agent 1420, transmitted to a media agent 1440, and converted into one or more backup copies that are sent to distributed data storage system 100 (via storage proxy 106) for storage. Control and management of the backup process is performed by storage manager 1400.

Storage manager 1400 is a centralized storage and/or information manager that is configured to perform certain control functions and also to store certain critical information about the data storage management system—hence storage manager 1400 is said to manage the data storage management system. Storage manager 1400 communicates with, instructs, and/or controls data agents 1420 and media agents 1440. According to certain embodiments, storage manager 1400 provides one or more of the following functions:

communicating with data agents 1420 and media agents 1440, including transmitting instructions, messages, and/or queries, as well as receiving status reports, index information, messages, and/or queries, and responding to same;

initiating execution of storage and/or information management operations;

initiating restore and recovery operations;

allocating secondary storage resources for secondary copy operations, e.g., distributed data storage system 100;

reporting, searching, and/or classification of data;

monitoring completion of and status reporting related to storage operations, information management operations, and jobs;

tracking age information relating to backup copies and initiating data pruning when appropriate;

protecting metadata of the data storage management system;

implementing job management, schedule management, event management, alert management, reporting, job history maintenance, user security management, disaster recovery management, and/or user interfacing for system administrators and/or end users of the data storage management system; etc.

Data agent 1420 is a component of the data storage management system and is generally directed by storage manager 1400 to participate in creating or restoring backup copies. A variety of different applications 132 can operate on a given client computing device 1020, including operating systems, file systems, database applications, e-mail applications, and virtual machines, just to name a few. And, as part of the process of creating and restoring backup copies, the client computing device 1020 may be tasked with processing and preparing the primary data 1120 generated by these various applications 132. Moreover, the nature of the processing/preparation can differ among application types, e.g., due to inherent structural, state, and formatting differences among applications 132 and/or the operating system of client computing device 1020. Each data agent 1420 is therefore advantageously configured to participate in storage operations and/or information management operations based on the type of primary data 1120 that is being protected at a client-specific and/or application-specific level. Data agent 1420 may be a computer software program (e.g., in the form of a set of executable binary files) that executes on the same client computing device 1020 as the associated application 132 that data agent 1420 is configured to protect or on an associated computing device. For instance, data agent 1420 may take part in copying, archiving, migrating, and/or replicating of certain primary data 1120. Data agent 1420 may receive control information from storage manager 1400, such as commands to transfer copies of data objects and/or metadata to one or more media agents 1440. Data agent 1420 also may format, compress, deduplicate, and/or encrypt certain primary data 1120, as well as capture application-related metadata before transmitting the processed data to media agent 1440. Data agent 1420 also may receive instructions from storage manager 1400 to restore (or assist in restoring) a backup copy such that the restored data may be properly accessed by application 132 as primary data 1120 in an application-native format. Each data agent 1420 may be specialized for a particular application 132.

Media agent 1440 is a component of the data storage management system and is generally directed by storage manager 1400 in creating and restoring backup copies such as backup copies stored at distributed data storage system 100. Whereas storage manager 1400 generally manages the data storage management system as a whole, media agent 1440 provides a portal to certain secondary storage resources, such as distributed data storage system 100 by having specialized features for communicating therewith, e.g., via storage proxy 106. Media agent 1440 may be a software program (e.g., in the form of a set of executable binary files) that executes on a backup computing device 1060. Media agent 1440 generally manages, coordinates, and facilitates the transmission of data between a data agent 1420 and secondary storage resources (e.g., system 100) associated with media agent 1440. For instance, other components in the system may interact with media agent 1440 to gain access to data stored on distributed data storage system 100, (e.g., to browse, read, write, modify, delete, or restore data).

The configuration depicted in the present figure uses distributed data storage system 100 as the storage target for backup copies. Backup copies generated by the data storage management system are transmitted by each media agent 1440 to a user virtual disk 170 (not shown here, but see virtual disk 170 in FIG. 1D), which is defined on the distributed storage system as the storage target for the backup copy. Hereinafter, virtual disks 170 will be referred to as "user virtual disks" 170 to distinguish them more clearly from the global deduplication virtual disk 1700. Storage proxy 106 intercepts the write requests issued by the media agent 1440 and applies deduplication to the incoming data blocks as described herein.

The storage service nodes 120 comprise physical data storage resources as shown in another figure. The illustrative global system deduplication virtual disk 1700 is configured as a virtual disk that is partitioned and replicated across a plurality of storage service nodes 120/122. Thus, the global system deduplication virtual disk 1700 is treated as a single logically-centralized repository of deduplicated data blocks across the distributed storage system, but physical storage is both partitioned and replicated across a plurality of storage service nodes 120/122.

The global system deduplication virtual disk (or "system-wide deduplication virtual disk") 1700 is partitioned into fixed size virtual chunks, each of which is called a storage container (illustratively embodied as a Hedvig Container). Different replicas are assigned for each storage container. Since replica assignment occurs at the storage container level, the data for a virtual disk such as the global system deduplication virtual disk 1700 is spread across the storage cluster. Replicas are chosen by metadata subsystem 140 according to replication factor and replication policy settings to support the application's data protection needs. See also FIG. 2B.

Figure 1H:
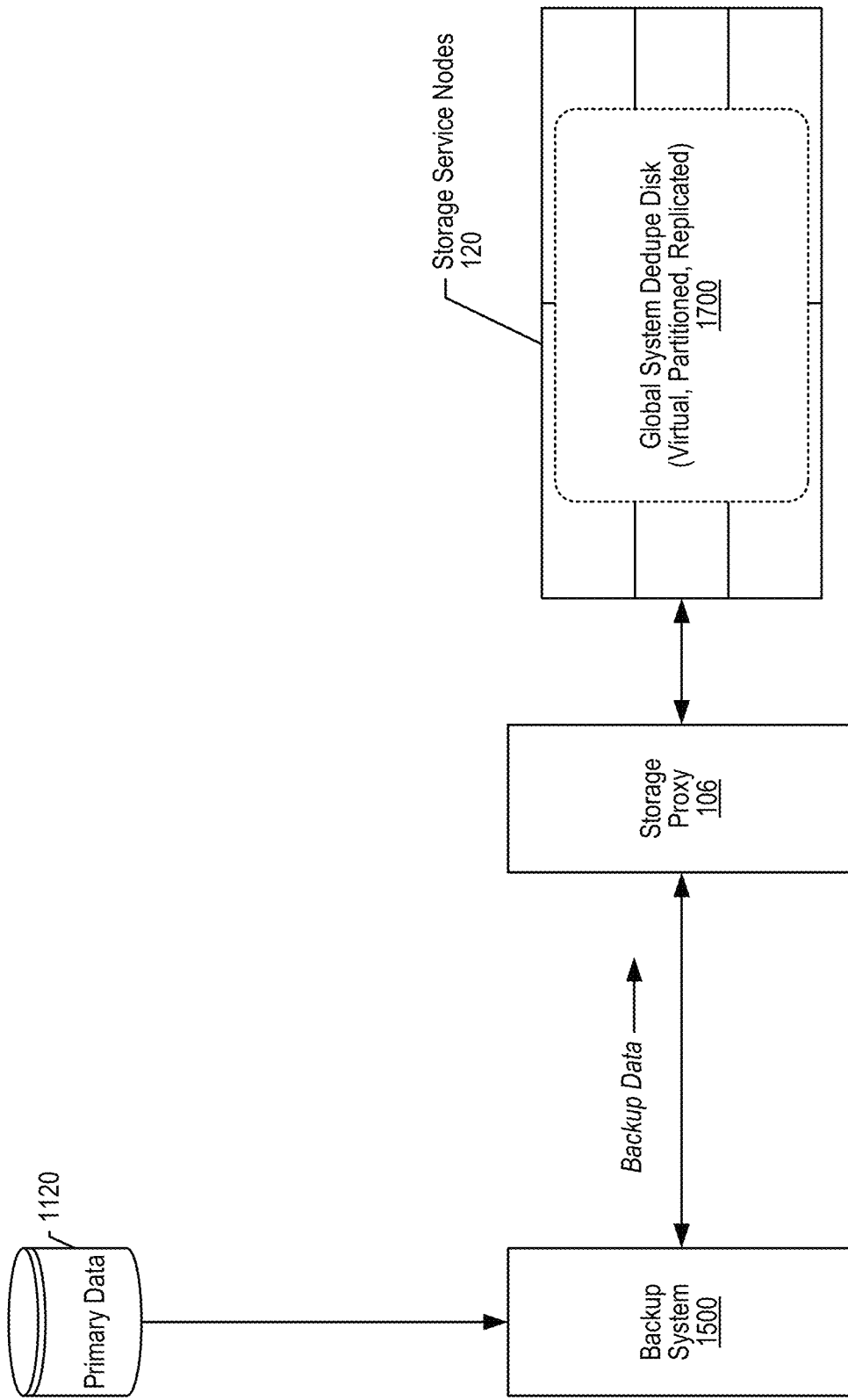
FIG. 1H is a block diagram illustrating a backup configuration in which a third-party backup system uses the illustrative distributed data storage system 100 for storing secondary (backup) copies according to an illustrative embodiment.

FIG. 1H is a block diagram illustrating a backup configuration in which a third-party backup system uses the illustrative distributed data storage system 100 for storing secondary (backup) copies according to an illustrative embodiment. This figure is analogous to FIG. 1G, except that backup copies originate with a third-party backup system 1500 rather than from the illustrative data storage management system of FIG. 1G. Accordingly, backup data is generated by backup system 1500 and addressed to a user virtual disk 170, which is defined on the distributed storage system as the storage target for the backup copy. Storage proxy 106 intercepts the write requests and applies deduplication to the incoming data blocks as described herein.

FIG. 2A is a block diagram depicting components that play a role in the present deduplication solution according to an illustrative embodiment. The present figure depicts: storage proxy 106 comprising deduplication tracking logic 206; pod subsystem 130 comprising epoch calculator 230; metadata subsystem 140 comprising deduplication tracking and garbage collection logic 240; and data storage subsystem comprising compaction logic 250 and write logic 252. Notably, the pod, metadata, and data storage subsystems components need not reside on the same storage service node, and may be deployed on various different storage service nodes. More details are given in FIG. 2B.

FIG. 2B is a block diagram depicting certain components that play a role in the present deduplication solution, providing additional details about the components depicted in FIG. 2A.

Figure 3:
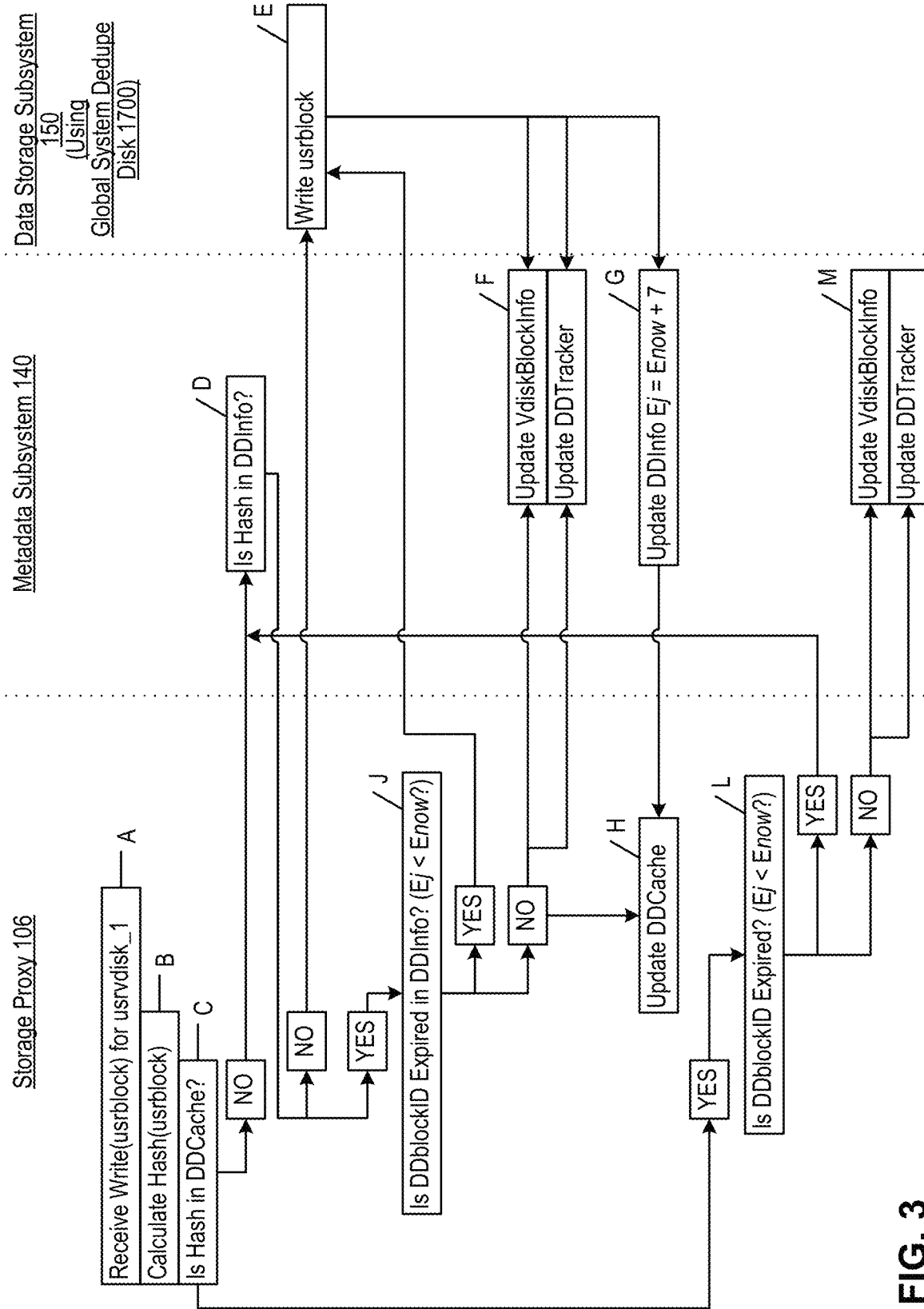
FIG. 3 depicts a fence diagram that illustrates some salient operations occurring during an I/O cycle of an incoming data block intercepted by a storage proxy.

Storage proxy 106 comprises deduplication management and tracking logic (e.g., "DD tracking logic") 206 and an index (e.g., "DDCache") 207 for tracking hash values and DDblockIDs with their associated expiry epochs. See also FIG. 2C. The DDCache 207 is where the DD tracking logic 206 checks whether a hash value computed for an incoming data block can be found, and if so, identifies a unique DDblockID and an expiry epoch for it. DD tracking logic 206 at storage proxy 106 illustratively performs the functionality of the storage proxy as depicted in FIG. 3.

Pod subsystem 130 uses an illustrative epoch calculator function 230 to provide a cluster-level epoch value 231 used for the illustrative discard or GC cycle. The current epoch value 231 is referred to herein as Enow. In every discard cycle, Enow is incremented during the discard preparation stage (+2) and incremented again during every discard stage (+1). Accordingly, the numerical values of Enow use the following pattern: Enow=0, 2(+2 GC Prep), 3(+1 GC), 5(+2 GC Prep), 6(+1 GC), 8, 9, etc. The scheme for setting the current epoch, Enow, is also depicted in block 401 of FIGS. 4 and 6.

Figure 4:
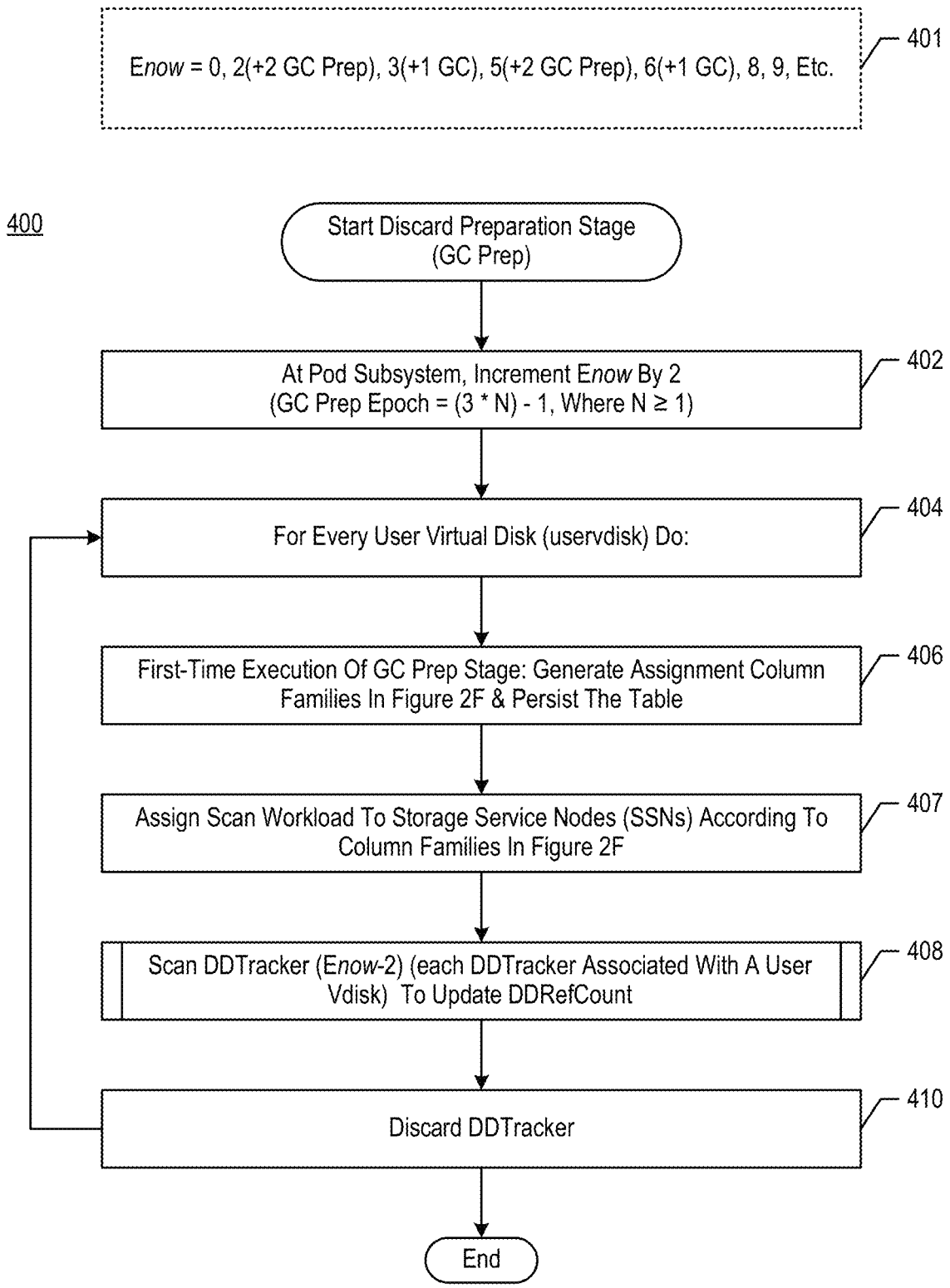
FIG. 4 depicts some salient operations of a method 400 according to an illustrative embodiment.
Figure 6:
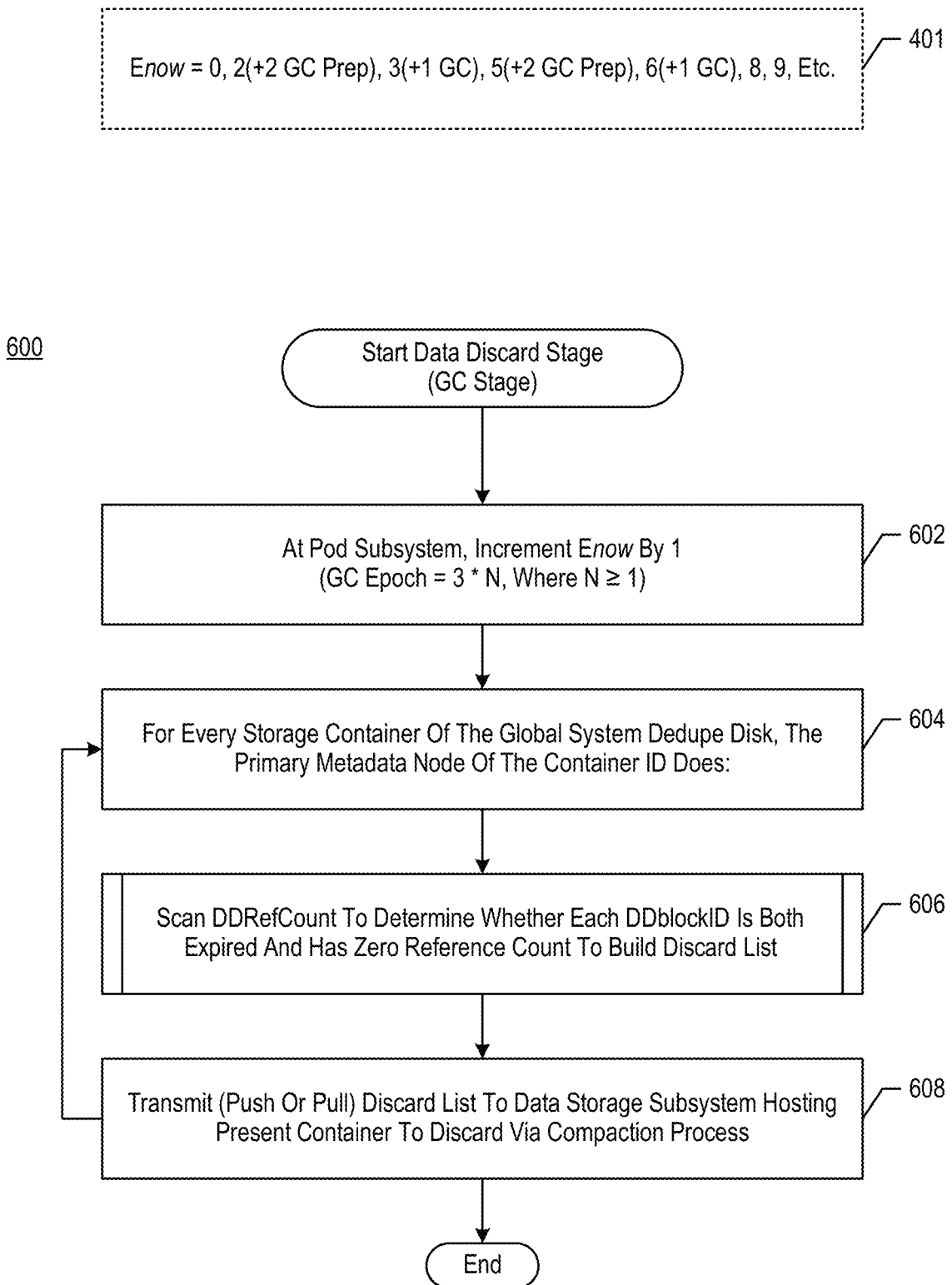
FIG. 6 depicts some salient operations of a method 600 according to an illustrative embodiment.

Metadata subsystem 140 comprises deduplication management, tracking, and GC logic (e.g., the "DD tracking and garbage collection logic") 240. Metadata subsystem 140 also maintains several data structures, illustratively organized as column families, e.g., VdiskBlockInfo 241, DDInfo 242, DDTracker 243, DDRefCount 244, GCCycleInfo 245, and Container-Specific Discard Lists 246. See also FIGS. 2C-2G. DD tracking and garbage collection logic 240 illustratively performs the functionality of metadata subsystem 140 as depicted in FIG. 3, as well as significant portions of methods 400 and 600 as depicted in FIGS. 4 and 6, respectively.

Data storage subsystem 150 comprises write logic 252 for adding new DDblockIDs to the global system deduplication virtual disk 1700, or more specifically, for writing new data blocks to the storage container(s) 260 hosted by the particular storage service node, e.g., C1, C2, C3, which are numbered 260-1, 260-2, and 260-3, respectively. See also FIG. 3. Data storage subsystem 150 receives container-specific discard lists 246 from metadata subsystem 140. Data storage subsystem 150 also comprises compaction logic 250 that removes the DDblockIDs received in the discard lists from the storage containers 260 at the storage service node 120/122. See also FIG. 6. Thus, each storage service node 120/122 that hosts one or more storage containers 260 belonging to the global system deduplication virtual disk 1700 is responsible for adding new blocks to and deleting blocks from those storage containers.

FIG. 2C depicts an illustrative column family for associating hash values with corresponding DDblockID and an associated expiry epoch, e.g., DDCache 207, DDInfo 242. This functions as an index of hash values. The DDCache 207 configured at a storage proxy 106 is configured according to this illustrative column family. Likewise, the DDInfo 242 configured at metadata subsystem 140 is also configured according to this column family. Information from DDInfo 242 is sometimes updated into DDCache 207 as needed. See also FIG. 3. Expiry extensions for certain DDblockIDs are updated into DDInfo 242 as needed during the GC phase of the discard cycle. See also FIG. 7.

FIG. 2D depicts an illustrative column family for tracking write requests received by storage proxies, e.g., DDTracker 243. In each discard cycle, a new DDTracker 243 column family tracks, for each user virtual disk 170, every new write request intercepted by storage proxies 106. The data is organized by storage container 260 belonging to the global system deduplication virtual disk 1700. For each DDblockID, its corresponding hash value is included, and the DDblockID receives a timestamp of Enow+1. Notably, the DDTracker 243 tables are discarded after their information is scanned and used for updating the DDRefCount 244 table family. See also FIG. 4. Thus, DDTracker 243 provides information on write requests that came in during a certain discard cycle and DDTracker 243 is re-populated in the next discard cycle.

FIG. 2E depicts an illustrative column family that is updated during each discard preparation stage based on scanning and processing DDTracker 243 information, e.g., DDRefCount 244. The information is organized according to storage containers 260 of the global system deduplication virtual disk 1700, and then by DDblockID. Columns for each user virtual disk 170 referencing the DDblockID are added. For every undeleted DDblockID, the preparation stage processes information in DDTracker 243, updates DDRefCount 244 entries, and updates the DDblockID expiry column. The reference write epoch (Ref W Epoch) columns are populated from the timestamp column in DDTracker 243. The reference expiry value (Ref Expiry) columns add to the write epoch a frequency for executing full backups of the particular user virtual disk 170 that references the DDblockID.

The expiry value assigned to the DDblockID (Eu) is the maximum value of the various Ref Expiry columns. Thus, the various backup frequencies of the various user virtual disks 170 are taken into consideration here. The Eu value is considered when deciding whether to discard a DDblockID. See also block 706 in FIG. 7. The Eu value is updated into DDInfo 242, if necessary, to extend the life of a DDblockID. See also block 709 in FIG. 7. The DDRefCount 244 column families are persisted across discard cycles, unlike DDTracker 243.

FIG. 2F depicts an illustrative column family that assigns the workload of scanning DDTracker 243 column families (each DDTracker 243 associated with a specific user virtual disk 170) for the purpose of updating DDRefCount 244. Various storage service nodes 120/122 are assigned the task. This table is generated on a first-time execution of the discard preparation stage and is persisted for future and repeated use in other discard cycles. See also block 406 in FIG. 4.

FIG. 2G depicts an illustrative column family that comprises DDblockID discard lists 246. These discard lists 246 are generated from the DDRefCount 244 column families during the discard (GC) stage, which follows the discard preparation stage. For each storage container 260 belonging to the global system deduplication virtual disk 1700, discard lists 246 are added, one discard list 246 per epoch when the discard list 246 was generated. The reason for multiple epochs showing up here is that the compaction logic or process 250 that actually discards DDblockIDs occurs asynchronously from any particular discard cycle, so it is possible for multiple lists 246 to accumulate before the compaction process 250 is triggered on any given storage service node.

In regard to the column families depicted in FIGS. 2C-2G, the depictions are illustrative and the invention is not so limited. In other embodiments, the data may be differently organized and the various stages responsible for generating and processing the data may also differ from what is depicted and described herein.

FIG. 3 depicts a fence diagram that illustrates some salient operations occurring during an I/O cycle of an incoming data block intercepted by a storage proxy 106. The fence diagram depicts operations at storage proxy 106 in the left-hand column (e.g., using DD tracking logic 206 and DDCache 207), operations at a metadata subsystem 140 in the center column (e.g., using DD tracking and garbage collection logic 240 and a number of data structures, e.g., 241, 242, 243), and operations at a data storage subsystem 150 in the right-hand column (e.g., using write logic 252) adding to the global system deduplication virtual disk 1700, which is a replicated and partitioned virtual disk.

At block A, storage proxy 106 receives a data block (usrblock) targeting a user virtual disk 170 (e.g., usrvdisk_1). At block B, storage proxy 106 calculates a hash value for the received data block. At block C, storage proxy 106 determines whether the calculated hash value is in the DDCache index 207. If yes, control passes to block L; otherwise, control passes to block D.

At block D, metadata subsystem 140 receives the hash value from storage proxy 106 and checks whether the hash value is in the DDInfo index 242. If yes, in the event that the metadata subsystem finds the hash value received from the storage proxy in DDInfo 242, metadata subsystem 140 responds to storage proxy 106 in the affirmative, providing the DDblockID and its associated expiry Ej according to DDInfo 242 and then control passes to block J. In the event metadata subsystem 140 has no record of the hash value in DDInfo 242, it responds in the negative to storage proxy 106; in this case, storage proxy 106 causes the data block to be added to the global system deduplication virtual disk 1700 at block E.

At block E, data storage subsystem 150 writes the new data block (usrblock) to the global system deduplication virtual disk 1700 and a new and unique deduplication block identifier (DDblockID) is assigned to the new data block at this point. Illustratively, 4 KB is the data block size stored at distributed data storage system 100 and hence each DDblockID refers to a 4 KB data block. Henceforth, for simplicity, we shall refer to data blocks in distributed data storage system 100 using the term "DDblockID," though it will be clear from context that the data block is stored in its entirety in the global system deduplication virtual disk 1700 and is tracked or referenced elsewhere by its DDblockID. Control then passes to blocks F and G. At block F, metadata subsystem 140 updates the VdiskBlockInfo 241 column family and the DDTracker 243 column family to reflect the write request and the DDblockID being added to the distributed data storage system. At block G, metadata subsystem 140 adds the new DDblockID to DDInfo 242 and assigns an expiry epoch (Ej) to DDblockID by adding 7 (as an illustrative example) to the value of the current epoch Enow. The increment of 7 is illustrative and stems from the fact that, because every discard cycle increments the epoch by a total of 3, it is desirable to give the data block at least two full discard cycles of initial lifetime (2×3=6). Since the timestamp epoch in DDTracker 243 is set to Enow+1, when 6 is added the increment becomes 7. Hence, at block G, Ej=Enow+7. Metadata subsystem 140 transmits this information to storage proxy 106. At block H, storage proxy 106 updates its DDCache 207 by associating the hash value with the DDblockID and expiry epoch Ej. At this point, the I/O cycle for this data block is complete.

Block J is reached when storage proxy 106 receives a DDblockID and associated expiry Ej from metadata subsystem 140 (from DDInfo 242) at block D. At block J, storage proxy 106 determines whether the DDblockID is expired according to the information received from metadata subsystem 140, i.e., whether Ej is earlier than Enow. If the DDblockID is expired, storage proxy 106 treats the incoming data block as a new data block to be added to the distributed data storage system and control passes to block E, which is described in more detail above. On the other hand, if at block J storage proxy 106 determines that the information received from DDInfo 242 indicates an unexpired DDblockID, the usrblock qualifies for deduplication and is not added to the global deduplication virtual disk 1700. Instead, at block H, storage proxy 106 updates its DDCache 207 by associating the hash value with the DDblockID and expiry epoch Ej received from DDInfo 242. Furthermore, at block F, metadata subsystem 140 updates the VdiskBlockInfo 241 column family and the DDTracker 243 column family to reflect the write request of the DDblockID. At this point, the i/O cycle for this data block is complete.

Block L is reached in the event that, at block C, storage proxy 106 finds the calculated hash value of usrblock in its DDCache 207. In DDCache 207, the hash value is associated with a DDblockID having an expiry epoch Ej and control passes to block L. At block L, storage proxy 106 determines, based on DDCache 207, whether the DDblockID is expired, i.e., whether its expiry epoch Ej is earlier than Enow. If DDCache 207 indicates that the DDblockID is expired, storage proxy 106 treats the incoming data block as if it weren't found in DDCache 207 and control passes to block D. Otherwise, if DDCache 207 indicates that the DDblockID is not expired, control passes to block M. Block M is the same as block F, i.e., metadata subsystem 140 updates the VdiskBlockInfo 241 column family and the DDTracker 243 column family to reflect the fact that a write request was received in the current epoch for this DDblockID. At this point, the I/O cycle for usrblock ends with block M.

FIG. 4 depicts some salient operations of a method 400 according to an illustrative embodiment. Method 400 illustrates the first phase of a discard cycle, the discard preparation ("GC prep") stage. Method 400 is performed by one or more components of the illustrative distributed data storage system 100. The operations of metadata subsystem 140 in method 400 are illustratively performed by DD tracking and garbage collection logic 240.

Block 401 depicts the scheme for setting the current epoch, Enow, to aid in the reader's understanding of the depicted method. In every discard cycle, Enow is incremented during the discard preparation stage (+2) and incremented again during every discard stage (+1). Accordingly, the numerical values of Enow use the following pattern: Enow=0, 2(+2 GC Prep), 3(+1 GC), 5(+2 GC Prep), 6(+1 GC), 8, 9, etc. This pattern is shown at the top of FIG. 4 in block 401 and results from the operation at block 402. Illustratively, epoch calculator 230 tracks and calculates Enow.

At block 402, at the beginning of a discard preparation stage, the pod subsystem (e.g., using epoch calculator 230) increments the current epoch value by 2. The general formula is GC Prep Epoch=(3*N)−1, where N≥1 and N is a discard cycle that includes the preparation stage and the discard stage.

At block 404, a loop is initiated for each user (user-defined) virtual disk configured on the distributed data storage system. The loop includes blocks 406-410.

At block 406, on a first-time execution of the discard preparation stage, metadata subsystem 140 generates the data structure in FIG. 2F, e.g., column family 286, which comprises certain workload assignments. Accordingly, the workload of scanning DDTracker 243 column families (see FIG. 2D) in each GC prep stage is assigned to a particular storage service node 120/122. Thanks to consistent hashing, the primary metadata node associated with each user virtual disk 170 is a deterministic hostname that receives the workload assignment and will carry out this workload going forward. The present data structure 286 is persisted, so that it can be used in the event that its host storage service node fails.

At block 407, the metadata node assigns the scan workload to one or more storage service nodes 120/122 according to data structure 286 in FIG. 2F.

At block 408, the assigned storage service node(s) 120/122, using a respective metadata subsystem 140, scan the DDTracker 243 column families (generated in epoch Enow-2 or Enow-3, if any). Since a write request can come in at any time, such as during a preparation stage, this scheme ensures that all such write requests are scanned during the next preparation stage. Thus, no write requests are left out of DDTracker 243 and therefore no write requests are left unscanned. Each DDTracker 243 column family is associated with a particular user virtual disk 170 (see FIG. 2D). The scan results are used to update DDRefCount 244 column families. See also FIG. 2E. More details on block 408 are given in a subsequent figure.

At block 410, after the scanning task is completed, the DDTracker 243 column families are discarded and control returns to block 404.

Figure 5:
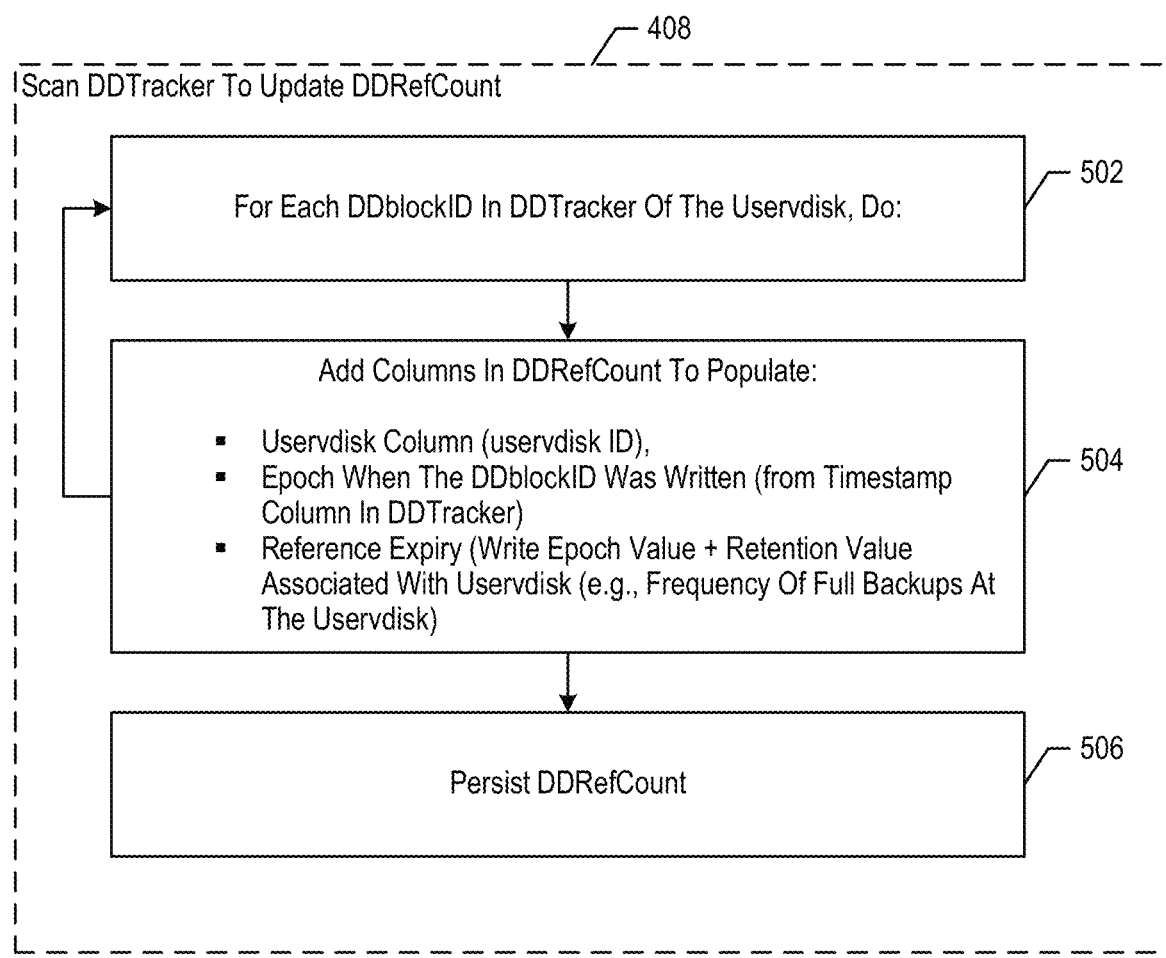
FIG. 5 depicts some salient operations of block 408 in method 400 according to an illustrative embodiment.

FIG. 5 depicts some salient operations of block 408 in method 400 according to an illustrative embodiment. This block is performed by the primary metadata node associated with each user virtual disk 170 according to data structure 286 in FIG. 2F.

At block 502, a loop is initiated for each DDblockID in the DDTracker 243 being scanned. The loop includes block 504.

At block 504, columns are added to DDRefCount 244 to: (i) populate the user virtual disk 170 (uservdisk) column; (ii) from the timestamp entry in DDTracker 243, populate the epoch value associated with the timeframe when the write request was received for the DDblockID, e.g., Ew; and (iii) assign an expiry epoch to the present reference based on the full backup frequency of the user virtual disk 170, e.g., Ew plus the full backup frequency of the user virtual disk 170. See also FIG. 2E. Control passes back to block 502.

At block 506, after DDRefCount 244 is fully updated from the DDTracker 243 scans, DDRefCount 244 is persisted. DDRefCount 244 will be used later during the second phase of the discard cycle.

FIG. 6 depicts some salient operations of a method 600 according to an illustrative embodiment. Method 600 illustrates the second phase of the discard cycle, the discard ("GC") stage. Method 600 is performed by one or more components of the illustrative distributed data storage system 100 unless otherwise noted. The operations of metadata subsystem 140 in method 600 are illustratively performed by the DD tracking and garbage collection logic 240.

Block 401 depicts the scheme for setting the current epoch, Enow, to aid in the reader's understanding of the depicted method. See also FIG. 4.

At block 602, at the beginning of a discard (GC) stage, pod subsystem 130 (e.g., using epoch calculator 230) increments the current epoch Enow value by 1. The general formula is GC Epoch=(3*N), where N 1 and N is a discard cycle that includes the preparation stage and the discard stage.

At block 604, a loop is initiated for each storage container 260 belonging to the global system deduplication virtual disk 1700. The loop includes blocks 606-608, which are executed by metadata subsystem 140 in the primary metadata node associated with the respective storage container 260.

At block 606, metadata subsystem 140 scans DDRefCount 244 to determine whether each DDblockID is both expired and has a zero reference count, in order to build the discard list 246 for the storage container 260. More details are given in a subsequent figure.

At block 608, the discard list 246 for the storage container 260 is pushed by metadata subsystem 140 to data storage subsystem 150 that hosts the storage container 260, possibly on another storage service node 120/122 distinct from the one hosting metadata subsystem 140. At data storage subsystem 150, a compaction process 250 will discard the DDblockIDs when it executes. In some embodiments, data storage subsystem 150 pulls the container discard list(s) 246 from metadata subsystem 140 asynchronously, when it has processing cycle time available. This alternative approach ensures that storage service nodes 120/122 do not get overwhelmed by the garbage cleanup task and instead can pull the discard lists 246 whenever they deem fit. This approach also ensures that if a storage service node 120/122 is down when a discard list 246 is pushed thereto, the storage service node can still obtain the discard list 246 and purge the blocks later. See also FIG. 2B. Control passes back to block 604.

Figure 7:
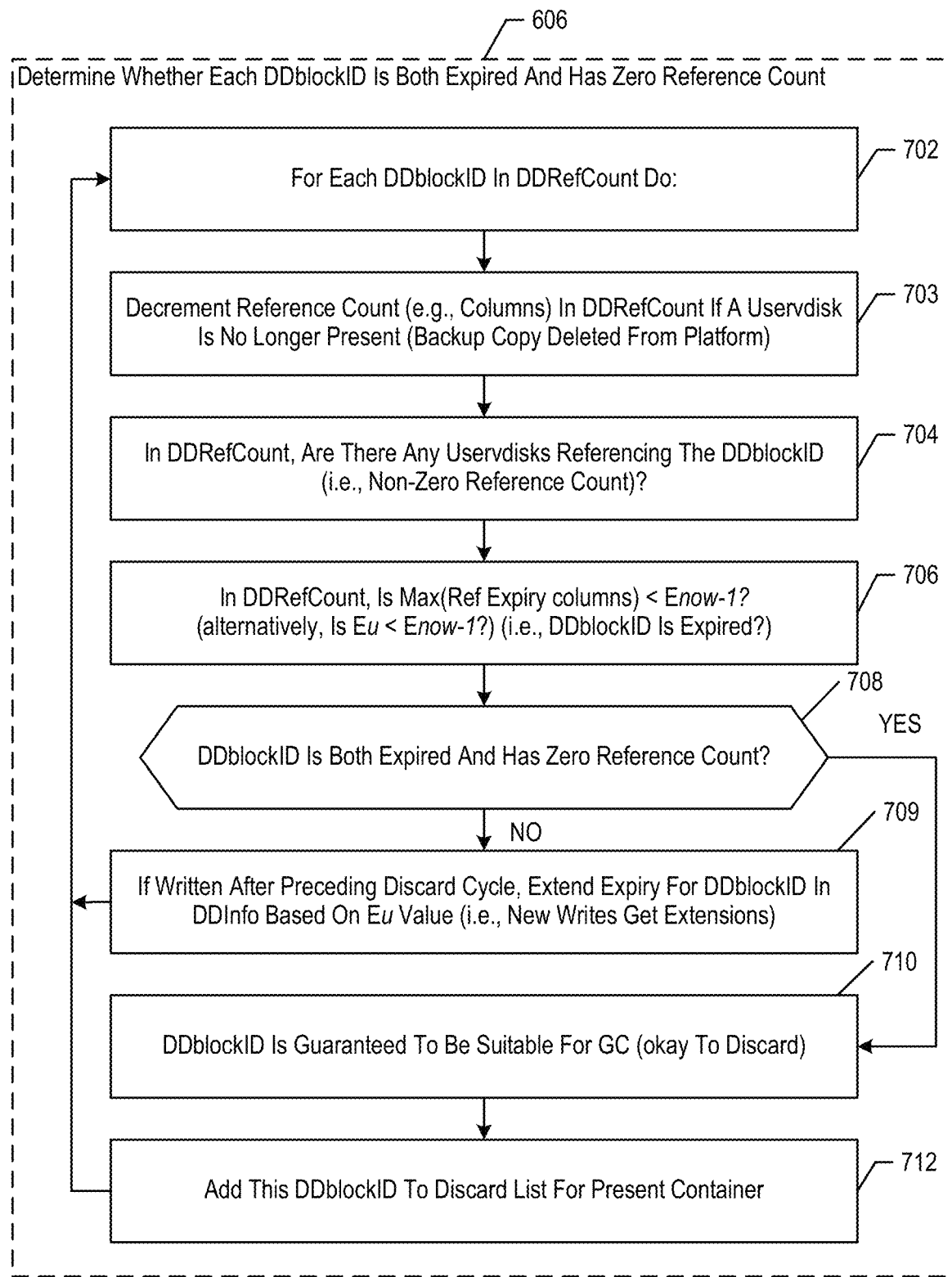
FIG. 7 depicts some salient operations of block 606 in method 600 according to an illustrative embodiment.

FIG. 7 depicts some salient operations of block 606 in method 600 according to an illustrative embodiment. This block is performed by the metadata subsystem in the primary metadata node associated with the respective storage container.

At block 702, a loop is initiated for each DDblockID in the DDRefCount 244 column family. The loop includes blocks 703-712.

At block 703, the reference count and/or entries in DDRefCount 244 are decremented to account for the deletion of a user virtual disk 170 from distributed data storage system 100. Illustratively, each backup copy received by distributed data storage system 100 comprises one or more files, and the distributed data storage system addresses each file to a file-specific user virtual disk 170. When the backup system that generated the backup copies prunes a stale backup copy from the distributed data storage system, the result is that the distributed data storage system deletes the various user virtual disks 170 associated with the stale backup copy. Thus, if user virtual disks 170 are deleted, they no longer reference certain DDblockIDs and this change is reflected in DDRefCount 244 at this point. Therefore, it is possible that a DDblockID may reach a point when no user virtual disks 170 make reference to it anymore.

At block 704, metadata subsystem 140 determines whether there are any references to the DDblockID in DDRefCount 244. As long there are, the DDblockID is not discarded.

At block 706, a maximum expiry epoch (e.g., Eu) is calculated for the DDblockID based on the reference expiry columns associated with the user virtual disks 170 that reference the DDblockID. Alternatively, the Eu value is extracted from DDRefCount 244, where Eu=Max(Ref Expiry columns). See also FIG. 2E. At this point, metadata subsystem 140 determines whether Eu is earlier than Enow-1. If so, the DDblockID is marked expired.

At block 708, which is a decision point, if metadata subsystem 140 determines that a given DDblockID is both expired (block 706) and carries a zero reference count (block 704), control passes to block 710; otherwise control passes to block 709.

Block 709 is reached when a DDblockID does not meet the requirements for being discarded, i.e., it has a non-zero reference count and/or is not expired. Here, the discard cycle considers whether an extension should be added to the expiry of the present DDblockID. If a new write request for the present DDblockID came in after the preceding analysis cycle (i.e., after the last time this evaluation was made), the DDblockID should be extended, because it is still current and actively being written by incoming backup copies. Accordingly, the Eu value from DDRefCount 244 is now populated into the DDInfo index 242, replacing the existing Ej expiry with the later Eu value (i.e., Eu>EJ). No replacement is needed or made if Ej≥Eu. Thus, here, a recently "written" data block has an opportunity for an extension to its expiry epoch long enough to span the sparsest full backups of all the user virtual disks 170 still referencing the DDblockID. Control passes back to block 702.

Block 710 is reached when a DDblockID that is both expired (block 706) and has no valid reference counts from any user virtual disks 170 (block 704). This DDblockID is now guaranteed to be suitable to discard from distributed data storage system 100.

At block 712, the DDblockID is added to the discard list 246 for the storage container 260 being analyzed. See also FIG. 2G. Control passes back to block 702.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an example embodiment, a distributed data storage system comprises: a storage proxy that executes on a first computing device; a first storage service node that hosts a metadata subsystem; a second storage service node that stores a plurality of deduplicated data blocks, wherein a system-wide deduplication virtual disk comprises the plurality of deduplicated data blocks, and wherein the system-wide deduplication virtual disk is distributed across a plurality of storage service nodes of the distributed data storage system, including the second storage service node; wherein the storage proxy is configured to: intercept write requests addressed to one or more user virtual disks configured on the distributed data storage system, which are distinct from the system-wide deduplication virtual disk, wherein a first one of the write requests comprises a first data block addressed to a first user virtual disk, and cause the first data block to be stored in the system-wide deduplication virtual disk, at least at the second storage service node; and wherein the metadata subsystem is configured to: assign an expiry timeframe to a first unique system-wide identifier (the first DDblockID) that is based on a hash value of and is associated with the first data block, wherein the expiry timeframe is based at least in part on an arrival timeframe of the first one of the write requests at the storage proxy and is further based on a frequency of full backup operations configured for the first user virtual disk, and cause the second storage service node to delete the first data block from the system-wide deduplication virtual disk, based on determining that (i) a current timeframe is later than the expiry timeframe of the first DDblockID and (ii) no user virtual disk in the distributed data storage system makes reference to the first DDblockID.

The above-recited embodiment wherein the metadata subsystem is further configured to: cause the first data block to be deleted from the system-wide deduplication virtual disk, including from the second storage service node, even when second data blocks referenced by the first user virtual disk and associated with a second DDblockID, which is distinct from the first DDblockID, are retained after the expiry timeframe of the first DDblockID. The above-recited embodiment configured with system-wide block-level deduplication and block-level expiry granularity. The above-recited embodiment wherein the expiry timeframe for the first DDblockID is further based on a maximum value of (i) the frequency of full backup operations configured for the first user virtual disk and (ii) one or more frequencies of full backup operations corresponding to one or more other user virtual disks referencing the first DDblockID. The above-recited embodiment wherein the expiry timeframe is further based on a maximum value of (i) the frequency of full backup operations configured for the first user virtual disk and (ii) one or more frequencies of full backup operations corresponding to one or more other user virtual disks referencing second data blocks having a same hash value as the first data block. The above-recited embodiment wherein the metadata subsystem is further configured to: update a data structure that tracks write requests addressed to the first user virtual disk, including the first one of the write requests that comprises the first data block. The above-recited embodiment wherein the metadata subsystem is further configured to: if a second data block received in a second one of the write requests is determined to have a same hash value as the first data block, is associated with the first DDblockID, and arrived at the storage proxy after a preceding discard cycle executed by the metadata subsystem, extend the expiry timeframe of the first DDblockID to span a sparsest full backup frequency of all user virtual disks referencing the first DDblockID. The above-recited embodiment wherein the metadata subsystem is further configured to: receive the hash value of the first data block from the storage proxy, determine that the hash value is associated with the first DDblockID, and update a data structure that tracks write requests addressed to the first user virtual disk, including the first one of the write requests that comprises the first data block. The above-recited embodiment wherein the first data block is associated with the first DDblockID based on a hash value of the first data block; wherein the storage proxy is further configured to check whether the expiry timeframe is less than a current timeframe; and wherein the metadata subsystem is further configured to: update a data structure that tracks write requests addressed to the first user virtual disk, including the first one of the write requests that comprises the first data block. The above-recited embodiment wherein the first data block is part of a backup copy, which is addressed to at least the first user virtual disk. The above-recited embodiment wherein the first data block is part of a backup copy addressed to the distributed data storage system; wherein when the backup copy is pruned, each distinct user virtual disk configured for the backup copy is logically removed from the distributed data storage system, which causes references to data blocks of the backup copy to be removed from the distributed data storage system; and wherein the metadata subsystem is further configured to: retain a second data block supplied by the backup copy if at least one other user virtual disk, not associated with the backup copy, references a DDblockID associated with the second data block.

According to another example embodiment, a distributed data storage system for storing backup copies with deduplication comprises: a first storage service node that hosts a metadata subsystem; a second storage service node that stores deduplicated data blocks, wherein a system-wide deduplication virtual disk is distributed across a plurality of storage service nodes of the distributed data storage system, including the second storage service node, wherein the system-wide deduplication virtual disk comprises the deduplicated data blocks, and wherein each deduplicated data block in the system-wide deduplication virtual disk is associated with a corresponding unique system-wide identifier; wherein the metadata subsystem is configured to: track data blocks addressed to user virtual disks configured in the distributed data storage system, including a first data block in a first write request addressed to a first user virtual disk, which is distinct from the system-wide deduplication virtual disk; associate the first data block with a first unique system-wide identifier (the first DDblockID) based on a hash value of the first data block, assign an expiry timeframe to the first DDblockID, wherein the expiry timeframe is based at least in part on an arrival timeframe of the first write request at a storage proxy and is further based on a frequency of full backup operations configured for the first user virtual disk, for a second data block, which arrived in a second write request after a preceding discard cycle executed by the metadata subsystem, wherein the second data block has a same hash value as the first data block which is associated with the first DDblockID, extend the expiry timeframe of the first DDblockID to span a sparsest full backup frequency of all user virtual disks referencing the first DDblockID.

The above-recited embodiment wherein the metadata subsystem is further configured to: cause a data block having the hash value of the first data block and associated with the first DDblockID to be retained in the system-wide deduplication virtual disk, based on determining that at least one of: (i) a current timeframe is earlier than the expiry timeframe of the first DDblockID and (ii) at least one user virtual disk in the distributed data storage system makes reference to the first DDblockID. The above-recited embodiment wherein the metadata subsystem is further configured to: cause a data block having the hash value of the first data block and associated with the first DDblockID to be deleted from the system-wide deduplication virtual disk, including from the second storage service node, based on determining that: (a) a current timeframe is later than the expiry timeframe of the first DDblockID and (b) no user virtual disk on the distributed data storage system makes reference to the first DDblockID. The above-recited embodiment wherein the first user virtual disk is configured for deduplication using block-level expiry granularity. The above-recited embodiment wherein the expiry timeframe is further based on a maximum value of (i) the frequency of full backup operations configured for the first user virtual disk and (ii) one or more frequencies of full backup operations corresponding to one or more other user virtual disks referencing the first DDblockID. The above-recited embodiment wherein the expiry timeframe is further based on a maximum value of (i) the frequency of full backup operations configured for the first user virtual disk and (ii) one or more frequencies of full backup operations corresponding to one or more other user virtual disks referencing second data blocks having a same hash value as the first data block. The above-recited embodiment wherein the storage proxy is further configured to check whether the expiry timeframe is less than the current timeframe. The above-recited embodiment wherein the first data block is part of a backup copy, which is addressed to at least the first user virtual disk. The above-recited embodiment wherein the first data block is part of a backup copy addressed to the distributed data storage system, wherein pruning the backup copy causes references to data blocks of the backup copy to be removed from the distributed data storage system; and wherein the metadata subsystem is further configured to: retain a second data block supplied by the backup copy if at least one other user virtual disk, not associated with the backup copy, references a DDblockID associated with the second data block.

According to an illustrative embodiment, a method for providing deduplication with block-level expiry granularity in a cloud-based distributed data storage system comprises: in a first cloud computing environment, configuring a first storage service node that hosts a metadata subsystem of the distributed data storage system, and further configuring a second storage service node that hosts a data storage subsystem of the distributed data storage subsystem, wherein the distributed data storage subsystem comprises a system-wide deduplication virtual disk that is distributed across a plurality of storage service nodes of the distributed data storage system, including the second storage service node, and wherein the system-wide deduplication virtual disk stores deduplicated data blocks; by the first storage service node hosting the metadata subsystem, assigning an expiry timeframe to a first unique system-wide identifier (the first DDblockID) that is based on a hash value of, and is associated with, a first data block stored in the system-wide deduplication virtual disk, wherein the expiry timeframe is based at least in part on: an arrival timeframe of the first data block at the distributed data storage system, and is further based on a full backup frequency configured for a first user virtual disk addressed by a write request comprising the first data block; and by the first storage service node hosting the metadata subsystem, if a second data block, which is received in a second write request addressing a second user virtual disk after a preceding discard cycle executed by the metadata subsystem, is determined to have a same hash value as the first data block and is associated with the first DDblockID, extending the expiry timeframe of the first DDblockID to span a sparsest full backup frequency of all user virtual disks referencing the first DDblockID, including the first user virtual disk and the second user virtual disk.

The above-recited embodiment further comprising: by the first storage service node hosting the metadata subsystem, causing the second storage service node to delete the first data block from the system-wide deduplication virtual disk, based on determining that (i) a current timeframe is later than the expiry timeframe of the first DDblockID and (ii) no user virtual disk in the distributed data storage system makes reference to the first DDblockID. The above-recited embodiment further comprising: by the second storage service node hosting the data storage subsystem, deleting the first data block from the system-wide deduplication virtual disk, based on a determination by the metadata subsystem that (i) a current timeframe is later than the expiry timeframe of the first DDblockID and (ii) no user virtual disk in the distributed data storage system makes reference to the first DDblockID. The above-recited embodiment further comprising: by a compaction logic of the data storage subsystem, deleting the first data block from the system-wide deduplication virtual disk, based on a determination by the metadata subsystem that (i) a current timeframe is later than the expiry timeframe of the first DDblockID and (ii) no user virtual disk in the distributed data storage system makes reference to the first DDblockID. The above-recited embodiment wherein the first data block is part of a backup copy addressed to the distributed data storage system, wherein pruning the backup copy causes references to data blocks of the backup copy to be removed from the distributed data storage system; and retaining a third data block supplied by the backup copy if at least one other user virtual disk, not associated with the backup copy, references a DDblockID associated with the third data block. The above-recited embodiment wherein the first data block is part of a backup copy addressed to the distributed data storage system; wherein when the backup copy is pruned, each distinct user virtual disk configured for the backup copy is logically removed from the distributed data storage system, which causes references to data blocks of the backup copy to be removed from the distributed data storage system; and by the metadata subsystem causing a third data block supplied by the backup copy to be retained in the system-wide deduplication virtual disk if at least one other user virtual disk, not associated with the backup copy, references a DDblockID associated with the third data block. The above-recited embodiment wherein the first data block is part of a backup copy addressed to the distributed data storage system, and wherein the backup copy is generated in one of: within the first cloud computing environment, and outside the first cloud computing environment. The above-recited embodiment wherein the expiry timeframe for the first DDblockID is further based on a maximum value of (i) the full backup frequency configured for the first user virtual disk and (ii) one or more full backup frequencies corresponding to one or more other user virtual disks referencing the first DDblockID. The above-recited embodiment wherein the expiry timeframe is further based on a maximum value of (i) the full backup frequency configured for the first user virtual disk and (ii) one or more full backup frequencies corresponding to one or more other user virtual disks referencing second data blocks having a same hash value as the first data block. The above-recited embodiment further comprising: by a storage proxy that executes on a first computing device that is operational outside the first cloud computing environment: intercepting write requests addressed to one or more user virtual disks configured on the distributed data storage system, which are distinct from the system-wide deduplication virtual disk, including intercepting the write request comprising the first data block, and causing the first data block to be stored in the system-wide deduplication virtual disk, at least at the second storage service node. The above-recited embodiment further comprising: by a storage proxy that executes on a first computing device that is operational within the first cloud computing environment: intercepting write requests addressed to one or more user virtual disks configured on the distributed data storage system, which are distinct from the system-wide deduplication virtual disk, including intercepting the write request comprising the first data block, and causing the first data block to be stored in the system-wide deduplication virtual disk, at least at the second storage service node. The above-recited embodiment further comprising: by a storage proxy that executes on a first computing device, intercepting write requests addressed to one or more user virtual disks configured on the distributed data storage system, which are distinct from the system-wide deduplication virtual disk, including intercepting the write request comprising the first data block; and by the metadata subsystem: receiving the hash value of the first data block from the storage proxy, determining that the hash value is associated with the first DDblockID, and updating a data structure that tracks write requests addressed to the first user virtual disk, including the write request that comprises the first data block. The above-recited embodiment further comprising: by a storage proxy that executes on a first computing device, intercepting write requests addressed to one or more user virtual disks configured on the distributed data storage system, which are distinct from the system-wide deduplication virtual disk, including intercepting the write request comprising the first data block; and by the metadata subsystem: receiving the hash value of the first data block from the storage proxy, determining that the hash value is associated with the first DDblockID, and updating a data structure that tracks write requests addressed to the first user virtual disk, including the write request that comprises the first data block.

According to another illustrative embodiment, a method for providing deduplication with block-level expiry granularity in a distributed data storage system comprises: in a first cloud computing environment comprising a first storage service node that hosts a metadata subsystem of the distributed data storage system, and further comprising a second storage service node that hosts a data storage subsystem of the distributed data storage subsystem, wherein the distributed data storage subsystem is configured with a system-wide deduplication virtual disk that is distributed across a plurality of storage service nodes of the distributed data storage system, including the second storage service node, and wherein the system-wide deduplication virtual disk stores deduplicated data blocks: by the metadata subsystem at first storage service node, assigning an expiry timeframe to a first unique system-wide identifier (the first DDblockID), wherein the first DDblockID is based on a hash value of, and is associated with, a first data block stored in the system-wide deduplication virtual disk, wherein the expiry timeframe is based at least in part on: an arrival timeframe of the first data block at the distributed data storage system, and spans a full backup frequency configured for a first user virtual disk addressed by a write request comprising the first data block, wherein the first user virtual disk is distinct from the system-wide deduplication virtual disk; and by the metadata subsystem executing a discard cycle: determining that a second data block, which was received in a second write request addressing a second user virtual disk and arrived at the distributed data storage system after a preceding discard cycle has a same hash value as the first data block, associating the second data block with the first DDblockID based on the same hash value, and extending the expiry timeframe of the first DDblockID to span a sparsest full backup frequency of all user virtual disks referencing the first DDblockID, including the first user virtual disk and the second user virtual disk.

The above-recited embodiment wherein the assigning of the expiry timeframe occurs during an input-output cycle of the first data block, which is distinct from the discard cycle. The above-recited embodiment further comprising: by the metadata subsystem executing a discard cycle, causing the second storage service node to delete the first data block from the system-wide deduplication virtual disk, based on the metadata subsystem determining that (i) a current timeframe is later than the expiry timeframe of the first DDblockID and (ii) no user virtual disk in the distributed data storage system makes reference to the first DDblockID. The above-recited embodiment further comprising: by the second storage service node hosting the data storage subsystem, deleting the first data block from the system-wide deduplication virtual disk, based on a determination by the metadata subsystem that (i) a current timeframe is later than the expiry timeframe of the first DDblockID and (ii) no user virtual disk in the distributed data storage system makes reference to the first DDblockID. The above-recited embodiment wherein the first data block is part of a backup copy addressed to the distributed data storage system, wherein pruning the backup copy causes references to data blocks of the backup copy to be removed from the distributed data storage system; and retaining a third data block supplied by the backup copy if at least one other user virtual disk, not associated with the backup copy, references a DDblockID associated with the third data block. The above-recited embodiment wherein the first data block is part of a backup copy addressed to the distributed data storage system, and wherein the backup copy is generated in one of: within the first cloud computing environment, and outside the first cloud computing environment. The above-recited embodiment further comprising: by a storage proxy that executes on a first computing device that is one of: operational outside the first cloud computing environment, and operational within the first cloud computing environment: intercepting write requests addressed to one or more user virtual disks configured on the distributed data storage system, which are distinct from the system-wide deduplication virtual disk, including intercepting the write request comprising the first data block, and causing the first data block to be stored in the system-wide deduplication virtual disk, at least at the second storage service node.

According to another illustrative embodiment, a system comprises a distributed data storage platform having system-wide deduplication with block-level expiry granularity. The above-recited embodiment wherein the useful life of each deduplicated data block is based on expiry parameters that relate to backup frequencies of the virtual disks referencing the data block, thus guaranteeing that data blocks are kept around between full backup cycles and are extended if still current. The above-recited embodiment wherein data blocks are retained as long as needed to bridge the gap between sparser backup operations. The above-recited embodiment wherein tracking data structures are updated only as needed, thus saving processing cycles and network bandwidth. The above-recited embodiment wherein the distributed data storage platform guarantees that stale references to DDblockIDs lingering in non-functional components cannot dictate whether a particular DDblockID is discarded.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for providing deduplication with block-level expiry granularity in a distributed data storage system, the method comprising:
   in a first cloud computing environment, configuring a first storage service node that hosts a metadata subsystem of the distributed data storage system, and further configuring a second storage service node that hosts a data storage subsystem of the distributed data storage system,
   wherein the distributed data storage system comprises a system-wide deduplication virtual disk that is distributed across the distributed data storage system, among a plurality of storage service nodes that includes the second storage service node;
   by the first storage service node hosting the metadata subsystem, assigning an expiry timeframe to a first unique system-wide identifier (DDblockID) that is associated with a first data block stored in the system-wide deduplication virtual disk,
   wherein the expiry timeframe is based on: an arrival timeframe of the first data block at the distributed data storage system, and is further based on a full backup frequency configured for a first user virtual disk addressed by a write request comprising the first data block; and
   for a second data block, which is received in a second write request addressing a second user virtual disk after a preceding discard cycle executed by the metadata subsystem, and which is determined to have a same hash value as the first data block and is associated with the first unique system-wide identifier,
   by the first storage service node hosting the metadata subsystem, extending the expiry timeframe of the first unique system-wide identifier to span a sparsest full backup frequency among all user virtual disks referencing the first unique system-wide identifier, including a full backup frequency of the first user virtual disk and a full backup frequency of the second user virtual disk;
   wherein the first storage service node comprises one or more hardware processors and data storage resources, and wherein the second storage service node comprises one or more hardware processors and data storage resources.

2. The method of claim 1, further comprising:
   by the first storage service node hosting the metadata subsystem, causing the second storage service node to delete the first data block from the system-wide deduplication virtual disk, based on determining that (i) a current timeframe is later than the expiry timeframe of the first unique system-wide identifier and (ii) no user virtual disk in the distributed data storage system makes reference to the first unique system-wide identifier.

3. The method of claim 1, further comprising:
   by the second storage service node hosting the data storage subsystem, deleting the first data block from the system-wide deduplication virtual disk, based on a determination by the metadata subsystem that (i) a current timeframe is later than the expiry timeframe of the first unique system-wide identifier and (ii) no user virtual disk in the distributed data storage system makes reference to the first unique system-wide identifier.

4. The method of claim 1, further comprising:
   by a compaction logic of the data storage subsystem, deleting the first data block from the system-wide deduplication virtual disk, based on a determination by the metadata subsystem that (i) a current timeframe is later than the expiry timeframe of the first unique system-wide identifier and (ii) no user virtual disk in the distributed data storage system makes reference to the first unique system-wide identifier.

5. The method of claim 1, wherein the first data block is part of a backup copy addressed to the distributed data storage system,
   wherein pruning the backup copy causes references to data blocks of the backup copy to be removed from the distributed data storage system; and further comprising:
   retaining a third data block supplied by the backup copy if at least one other user virtual disk, not associated with the backup copy, references a unique system-wide identifier that is associated with the third data block.

6. The method of claim 1, wherein the first data block is part of a backup copy addressed to the distributed data storage system;
   wherein when the backup copy is pruned, each distinct user virtual disk configured for the backup copy is logically removed from the distributed data storage system, which causes references to data blocks of the backup copy to be removed from the distributed data storage system; and further comprising:
   by the metadata subsystem, causing a third data block supplied by the backup copy to be retained in the system-wide deduplication virtual disk if at least one other user virtual disk, not associated with the backup copy, references a unique system-wide identifier that is associated with the third data block.

7. The method of claim 1, wherein the first data block is part of a backup copy addressed to the distributed data storage system, and wherein the backup copy is generated in one of: within the first cloud computing environment, and outside the first cloud computing environment.

8. The method of claim 1, wherein the expiry timeframe for the first unique system-wide identifier is further based on a maximum value of (i) the full backup frequency configured for the first user virtual disk and (ii) one or more full backup frequencies corresponding to one or more other user virtual disks referencing the first unique system-wide identifier.

9. The method of claim 1, wherein the expiry timeframe is further based on a maximum value of (i) the full backup frequency configured for the first user virtual disk and (ii) one or more full backup frequencies corresponding to one or more other user virtual disks referencing second data blocks having a same hash value as the first data block.

10. The method of claim 1 further comprising:
by a storage proxy that executes on a first computing device that is operational outside the first cloud computing environment, wherein the first computing device comprises one or more hardware processors:
intercepting write requests addressed to one or more user virtual disks configured on the distributed data storage system, including intercepting the write request comprising the first data block, wherein the one or more user virtual disks are distinct from the system-wide deduplication virtual disk, and
causing the first data block to be stored in the system-wide deduplication virtual disk, at least at the second storage service node.

11. The method of claim 1 further comprising:
by a storage proxy that executes on a first computing device that is operational within the first cloud computing environment, wherein the first computing device comprises one or more hardware processors:
intercepting write requests addressed to one or more user virtual disks configured on the distributed data storage system, including intercepting the write request comprising the first data block, wherein the one or more user virtual disks are distinct from the system-wide deduplication virtual disk, and
causing the first data block to be stored in the system-wide deduplication virtual disk, at least at the second storage service node.

12. The method of claim 1, further comprising:
by a storage proxy that executes on a first computing device outside the first cloud computing environment, wherein the first computing device comprises one or more hardware processors: intercepting write requests addressed to one or more user virtual disks configured on the distributed data storage system, including intercepting the write request comprising the first data block, wherein the one or more user virtual disks are distinct from the system-wide deduplication virtual disk; and
by the metadata subsystem:
receiving a hash value of the first data block from the storage proxy,
determining that the hash value of the first data block is associated with the first unique system-wide identifier, and
updating a data structure that tracks write requests addressed to the first user virtual disk, including the write request that comprises the first data block.

13. The method of claim 1, further comprising:
by a storage proxy that executes on a first computing device within the first cloud computing environment, wherein the first computing device comprises one or more hardware processors: intercepting write requests addressed to one or more user virtual disks configured on the distributed data storage system, including intercepting the write request comprising the first data block, wherein the one or more user virtual disks are distinct from the system-wide deduplication virtual disk; and
by the metadata subsystem:
receiving a hash value of the first data block from the storage proxy,
determining that the hash value of the first data block is associated with the first unique system-wide identifier, and
updating a data structure that tracks write requests addressed to the first user virtual disk, including the write request that comprises the first data block.

14. A method for providing deduplication with block-level expiry granularity in a distributed data storage system, the method comprising:
in a first cloud computing environment comprising a first storage service node that hosts a metadata subsystem of the distributed data storage system, and further comprising a second storage service node that hosts a data storage subsystem of the distributed data storage system, wherein a system-wide deduplication virtual disk is distributed across the distributed data storage system, among a plurality of storage service nodes that includes the second storage service node, and wherein deduplicated data blocks are stored in the system-wide deduplication virtual disk:
by the metadata subsystem at the first storage service node, assigning an expiry timeframe to a first unique system-wide identifier (DDblockID), wherein the first unique system-wide identifier is associated with a first data block stored in the system-wide deduplication virtual disk,
wherein the expiry timeframe is based on: an arrival timeframe of the first data block at the distributed data storage system, and spans a full backup frequency configured for a first user virtual disk addressed by a write request comprising the first data block, wherein the first user virtual disk is distinct from the system-wide deduplication virtual disk; and
by the metadata subsystem executing a discard cycle, comprising:
determining that a second data block, which was received in a second write request addressing a second user virtual disk and which arrived at the distributed data storage system after a preceding discard cycle, has a same hash value as the first data block,
associating the second data block with the first unique system-wide identifier based on the same hash value, and
extending the expiry timeframe of the first unique system-wide identifier to span a sparsest full backup frequency among all user virtual disks referencing the first unique system-wide identifier, including a full backup frequency of the first user virtual disk and a full backup frequency of the second user virtual disk;
wherein the first storage service node comprises one or more hardware processors and data storage resources, and wherein the second storage service node comprises one or more hardware processors and data storage resources.

15. The method of claim 14, wherein the assigning of the expiry timeframe occurs during an input-output cycle of the first data block, which is distinct from the discard cycle.

16. The method of claim 14, further comprising:
by the metadata subsystem executing a discard cycle comprising: causing the second storage service node to delete the first data block from the system-wide deduplication virtual disk, based on the metadata subsystem determining that (i) a current timeframe is later than the expiry timeframe of the first unique system-wide identifier and (ii) no user virtual disk in the distributed data storage system makes reference to the first unique system-wide identifier.

17. The method of claim 14, further comprising:
by the second storage service node hosting the data storage subsystem, deleting the first data block from the system-wide deduplication virtual disk, based on a determination by the metadata subsystem that (i) a current timeframe is later than the expiry timeframe of the first unique system-wide identifier and (ii) no user virtual disk in the distributed data storage system makes reference to the first unique system-wide identifier.

18. The method of claim 14, wherein the first data block is part of a backup copy addressed to the distributed data storage system,
  wherein pruning the backup copy causes references to data blocks of the backup copy to be removed from the distributed data storage system; and further comprising:
  retaining, in the system-wide deduplication virtual disk, a third data block supplied by the backup copy if at least one other user virtual disk, not associated with the backup copy, references a unique system-wide identifier associated with the third data block.

19. The method of claim 14, wherein the first data block is part of a backup copy addressed to the distributed data storage system, and wherein the backup copy is generated in one of: within the first cloud computing environment, and outside the first cloud computing environment.

20. The method of claim 19 further comprising:
  by a storage proxy that executes on a first computing device that is one of: operational outside the first cloud computing environment, and operational within the first cloud computing environment, wherein the first computing device comprises one or more hardware processors:
  intercepting write requests addressed to one or more user virtual disks configured on the distributed data storage system, including intercepting the write request comprising the first data block, wherein the one or more user virtual disks are distinct from the system-wide deduplication virtual disk, and
  causing the first data block to be stored in the system-wide deduplication virtual disk, at least at the second storage service node.

\* \* \* \* \*